(12) United States Patent
Kim et al.

(10) Patent No.: US 12,360,601 B2
(45) Date of Patent: Jul. 15, 2025

(54) VIBRATION APPARATUS AND DISPLAY APPARATUS INCLUDING THE SAME

(71) Applicant: LG Display Co., Ltd., Seoul (KR)

(72) Inventors: Seunghyeon Kim, Paju-si (KR); JunSeok Oh, Paju-si (KR); SunBok Song, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/418,638

(22) Filed: Jan. 22, 2024

(65) Prior Publication Data

US 2024/0256044 A1    Aug. 1, 2024

(30) Foreign Application Priority Data

Jan. 31, 2023  (KR) ........................ 10-2023-0013248

(51) Int. Cl.
*G06F 3/01*     (2006.01)
*G06F 3/041*    (2006.01)

(52) U.S. Cl.
CPC ............ *G06F 3/016* (2013.01); *G06F 3/0416* (2013.01)

(58) Field of Classification Search
CPC ...... G06F 3/016; G06F 3/0416; G06F 3/0412; G06F 3/1407
See application file for complete search history.

(56) References Cited

U.S. PATENT DOCUMENTS

| | | | |
|---|---|---|---|
| 2008/0122797 A1* | 5/2008 | Soh ..................... | G06F 3/0488 345/173 |
| 2009/0153966 A1* | 6/2009 | Matsumoto .......... | H04N 23/811 359/508 |
| 2017/0220114 A1* | 8/2017 | Iino ....................... | B60K 35/10 |
| 2018/0213113 A1* | 7/2018 | Takano ................. | G06F 1/163 |
| 2019/0155391 A1* | 5/2019 | Hashimoto ........... | G06F 3/0412 |
| 2019/0297176 A1* | 9/2019 | Lee ...................... | G06F 3/016 |
| 2020/0007967 A1* | 1/2020 | Kim ..................... | H04R 1/028 |
| 2020/0055087 A1* | 2/2020 | Fujimoto .............. | B06B 1/0651 |
| 2020/0059733 A1* | 2/2020 | Shin ..................... | G06F 3/016 |
| 2020/0103973 A1* | 4/2020 | Ahn ..................... | H10N 30/20 |
| 2020/0133425 A1* | 4/2020 | Taninaka .............. | G06F 3/0414 |
| 2020/0167122 A1* | 5/2020 | Lee ....................... | G06F 3/16 |
| 2020/0192545 A1* | 6/2020 | Oh ....................... | G06F 1/1688 |
| 2020/0241642 A1* | 7/2020 | Oh ....................... | G06F 3/016 |
| 2020/0326809 A1* | 10/2020 | Kamata ................ | G06F 3/041 |
| 2020/0363287 A1* | 11/2020 | Kinoshita ............. | G01M 7/025 |
| 2021/0041954 A1* | 2/2021 | Oh ....................... | G06F 3/016 |
| 2021/0076135 A1* | 3/2021 | Choi .................... | H04R 1/403 |
| 2021/0109396 A1* | 4/2021 | Lee ...................... | G02B 1/18 |
| 2021/0173487 A1* | 6/2021 | Ham ..................... | H04R 1/028 |
| 2021/0366456 A1* | 11/2021 | Jeong ................... | G06F 1/1605 |
| 2022/0070563 A1* | 3/2022 | Kim ..................... | H04R 23/00 |
| 2022/0182744 A1* | 6/2022 | Han ...................... | H04R 1/02 |
| 2022/0201399 A1* | 6/2022 | Kim ..................... | H04R 17/00 |
| 2022/0210530 A1* | 6/2022 | Lee ...................... | H04R 17/00 |

(Continued)

*Primary Examiner* — Amy Onyekaba
(74) *Attorney, Agent, or Firm* — Morgan, Lewis & Bockius LLP

(57) ABSTRACT

A vibration apparatus includes a vibration member including a first vibration generating part in first area of a vibration member, and a second vibration generating part in a second area of the vibration member. The first vibration generating part and the second vibration generating part are configured to vibrate the vibration member in one or more vibration mode shapes.

22 Claims, 17 Drawing Sheets

(56) References Cited

U.S. PATENT DOCUMENTS

| | | | |
|---|---|---|---|
| 2022/0210577 A1* | 6/2022 | Ha | H04R 17/005 |
| 2022/0277425 A1* | 9/2022 | Ikenoue | G02B 27/646 |
| 2022/0371051 A1* | 11/2022 | Kim | H04R 1/2803 |
| 2022/0383710 A1* | 12/2022 | Ito | G06F 3/016 |

* cited by examiner

VIBRATION APPARATUS AND DISPLAY APPARATUS INCLUDING THE SAME

CROSS-REFERENCE TO RELATED APPLICATION

This application claims the benefit and priority to Korean Patent Application No. 10-2023-0013248 filed in the Republic of Korea on Jan. 31, 2023, the entire disclosure of which is hereby expressly incorporated by reference into the present application.

BACKGROUND

Technical Field

The present disclosure relates to a vibration apparatus and a display apparatus including the same.

Description of the Related Art

As the information-oriented society advances, the demands for display apparatuses for displaying an image have increased variously.

Electronic devices which use a display apparatus as a display screen provide a user interface of a touch screen type, for the convenience of a user input. Display apparatuses capable of touch interface processing have advanced to provide various functions.

Display apparatuses with a touch screen integrated therein or display apparatuses, including a touch panel capable of touch sensing based on a touch pen (or a stylus pen) as well as finger touch sensing based on a finger, are being widely used.

Recently, haptic technology for providing a haptic feedback or a tactile feedback corresponding to a touch input when a user touches a screen of a display apparatus has developed. A display apparatus to which the haptic technology is applied may generate an attractive force which stimulates a tangoreceptor of a human body, and thus, may stimulate a tactile sense of a user, thereby allowing the user to recognize a touch and/or a texture of the touch.

SUMMARY

The inventors have performed various and extensive research and experiments on a vibration apparatus and a display apparatus including the same, which may provide a user with a low frequency vibration or a low frequency haptic feedback when a user touch is applied. Based on the various and extensive research and experiments, the inventors have invented a new vibration apparatus and a display apparatus including the same, which may provide a user with a low frequency vibration or a low frequency haptic feedback.

An aspect of the present disclosure is directed to providing a vibration apparatus and a display apparatus including the same, which may enhance a vibration characteristic of a low frequency band.

Another aspect of the present disclosure is directed to providing a vibration apparatus and a display apparatus including the same, which may implement one or more vibration mode shapes (or patterns).

Another aspect of the present disclosure is directed to providing a vibration apparatus and a display apparatus including the same, which may vibrate a display member based on one or more vibration mode shapes to provide a user with a low frequency vibration or a low frequency haptic feedback.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the present disclosure, or derivable therefrom, and the claims hereof as well as the appended drawings.

To achieve these and other aspects of the inventive concepts, as embodied and broadly described herein, a vibration apparatus according to an aspect of the present disclosure may include, a first vibration generating part in the first area of the vibration member, and a second vibration generating part in the second area of the vibration member. The first vibration generating part and the second vibration generating part may be configured to each vibrate the vibration member in one or more vibration mode shapes.

A vibration apparatus according to an aspect of the present disclosure may include a display member configured to display an image, one or more vibration apparatuses configured to vibrate the display member, and a vibration driving circuit configured to sense a touch position of the display member and control the one or more vibration apparatuses based on the sensed touch position. The one or more vibration apparatuses may include a first vibration generating part in a first area of the display member and a second vibration generating part in a second area of the display member. The first vibration generating part and the second vibration generating part may be configured to vibrate the display member in one or more vibration mode shapes.

According to one or more aspects of the present disclosure, a vibration apparatus and a display apparatus including the same, which may enhance a vibration characteristic of a low frequency band, may be provided.

According to one or more aspects of the present disclosure, a vibration apparatus and a display apparatus including the same, which may implement one or more vibration mode shapes, may be provided.

According to one or more aspects of the present disclosure, a vibration apparatus and a display apparatus including the same, which may vibrate a display member based on one or more vibration mode shapes to provide a user with a low frequency vibration or a low frequency haptic feedback, may be provided.

According to one or more aspects of the present disclosure, a vibration characteristic of a low frequency band may be enhanced despite using a piezoelectric device which is lightweight and has low power consumption, and thus, a vibration apparatus and a display apparatus including the same, which may implement or realize low power and lightness, may be provided.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the present disclosure. Nothing in this section should be taken as a limitation on the present disclosure. Further aspects and advantages are discussed below in conjunction with aspects of the disclosure.

It is to be understood that both the foregoing description and the following description are exemplary and explanatory and are intended to provide further explanation of the inventive concepts as claimed.

BRIEF DESCRIPTION OF THE DRAWINGS

The accompanying drawings that may be included to provide a further understanding of the disclosure and are incorporated in and constitute a part of the present disclosure, illustrate aspects of the disclosure and together with the description serve to explain various principles of the disclosure.

Figure 1:
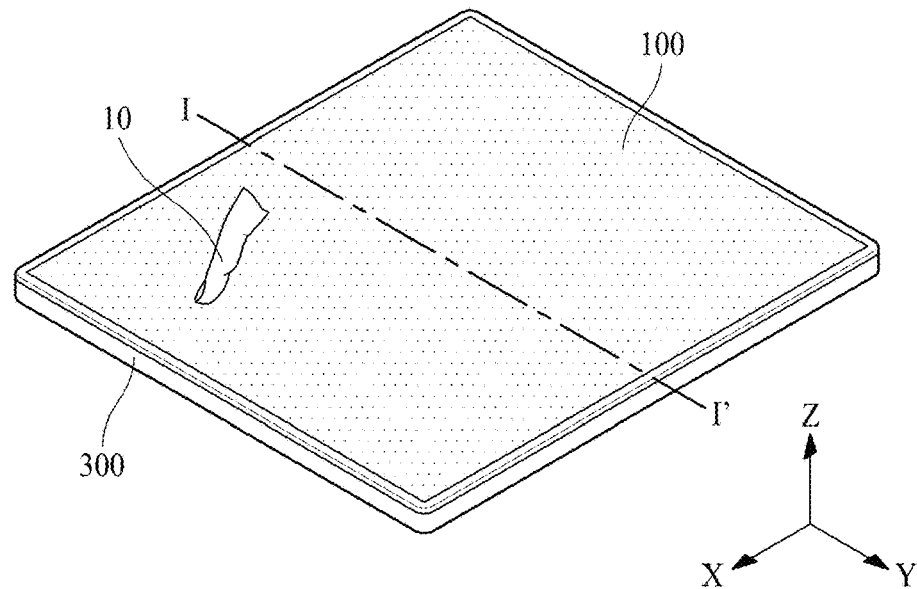
FIG. 1 is a perspective view illustrating a display apparatus according to an aspect of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction of thereof can be exaggerated for clarity, illustration, and/or convenience.

DETAILED DESCRIPTION

Reference is now made in detail to aspects of the present disclosure, examples of which can be illustrated in the accompanying drawings. In the following description, when a detailed description of well-known functions, structures or configurations can unnecessarily obscure aspects of the present disclosure, the detailed description thereof may have been omitted for brevity. Further, repetitive descriptions may be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the aspects described with reference to the accompanying drawings. The present disclosure can, however, be embodied in different forms and should not be construed as limited to the aspects set forth herein. Rather, these aspects are examples and are provided so that this disclosure can be thorough and complete, to assist those skilled in the art to understand the inventive concepts without limiting the protected scope of the present disclosure.

Shapes (e.g., sizes, lengths, widths, heights, thicknesses, locations, radii, diameters, and areas), sizes, ratios, angles, numbers, and the like disclosed herein, including those illustrated in the drawings are merely examples, and thus, the present disclosure is not limited to the illustrated details. Any implementation described herein as an "example" is not necessarily to be construed as preferred or advantageous over other implementations. It is, however, noted that the relative dimensions of the components illustrated in the drawings are part of the present disclosure.

When the term "comprise," "have," "include," "contain," "constitute," "made of," "formed of," or the like is used with respect to one or more elements, one or more other elements may be added unless a term such as "only" or the like is used. The terms used in the present disclosure are merely used in order to describe example aspects, and are not intended to limit the scope of the present disclosure. The terms of a singular form may include plural forms unless the context clearly indicates otherwise.

The word "exemplary" is used to mean serving as an example or illustration. Aspects are example aspects. "Aspects," "examples," "aspects," and the like should not be construed as preferred or advantageous over other implementations. An aspect, an example, an example aspect, an aspect, or the like may refer to one or more aspects, one or more examples, one or more example aspects, one or more aspects, or the like, unless stated otherwise. Further, the term "may" encompasses all the meanings of the term "can."

In one or more aspects, unless explicitly stated otherwise, element, feature, or corresponding information (e.g., a level, range, dimension, size, or the like) is construed to include an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

In describing a positional relationship, when the positional relationship between two parts (e.g., layers, films, regions, components, sections, or the like) is described, for example, using "on," "upon," "on top of," "over," "under," "above," "below," "beneath," "near," "close to," "adjacent to," "beside," "next to," "at or on a side of," or the like, one or more parts may be located between two other parts unless a more limiting term, such as "immediate(ly)," "direct(ly)," or "close(ly)," is used. For example, when a structure is described as being positioned "on," "upon," "on top of," "over," "under," "above," "below," "beneath," "near," "close to," "adjacent to," "beside," "next to," "at or on a side of," or the like another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, can include all directions of "above" and "below." Likewise, an exemplary term "above" or "on" can include both directions of "above" and "below."

In describing a temporal relationship, when the temporal order is described as "after," "subsequent," "next," "before," "preceding," "prior to," or the like a case which is not consecutive or not sequential may be included and thus one or more other events may occur therebetween, unless a more limiting term, such as "just," "immediate(ly)," or "direct (ly)" is used.

The terms, such as "below," "lower," "above," "upper" and the like, may be used herein to describe a relationship between element(s) as illustrated in the drawings. It will be understood that the terms are spatially relative and based on the orientation depicted in the drawings.

It is understood that, although the terms "first", "second," or the like may be used herein to describe various elements (e.g., layers, films, regions, components, sections, or the like), these elements should not be limited by these terms, for example, to any particular order, sequence, precedence, or number of elements. These terms are used only to partition one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element and the like) are not limited by ordinal numbers or the names in front of the elements. Further, a first element may include one or more first elements. Similarly, a second element or the like may include one or more second elements or the like.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

For the expression that an element (e.g., layer, film, region, component, section, or the like) is "connected," "coupled," "attached," "adhered," or the like to another element, the element can not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e.g., layer, film, region, component, section, or the like) is "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The phase that an element (e.g., layer, film, region, component, section, or the like) is "provided in," "disposed in," or the like in another element may be understood as that at least a portion of the element is provided in, disposed in, or the like in another element, or that the entirety of the element is provided in, disposed in, or the like in another element. The phase that an element (e.g., layer, film, region, component, section, or the like) "contacts," "overlaps," or the like with another element may be understood as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a "line" or "direction" should not be interpreted only based on a geometrical relationship in which the respective lines or directions are parallel or perpendicular to each other, and may be meant as lines or directions having wider directivities within the range within which the components of the present disclosure can operate functionally. For example, the terms "first direction," "second direction," and the like, such as a direction parallel or perpendicular to "x-axis," "y-axis," or "z-axis," should not be interpreted only based on a geometrical relationship in which the respective directions are parallel or perpendicular to each other, and may be meant as directions having wider directivities within the range within which the components of the present disclosure can operate functionally.

The term "at least one" should be understood as including any and all combinations of one or more of the associated listed items. For example, each of the phrases of "at least one of a first item, a second item, or a third item" and "at least one of a first item, a second item, and a third item" may represent (i) a combination of items provided by two or more of the first item, the second item, and the third item or (ii) only one of the first item, the second item, or the third item.

The expression of a first element, a second elements "and/or" a third element should be understood as one of the first, second and third elements or as any or all combinations of the first, second and third elements. By way of example, A, B and/or C can refer to only A; only B; only C; any of A, B, and C (e.g., A, B, or C); or some or some combination of A, B, and C (e.g., A and B; A and C; or B and C); or all of A, B, and C. Furthermore, an expression "A/B" may be understood as A and/or B. For example, an expression "A/B" can refer to only A; only B; A or B; or A and B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two. Furthermore, when an element (e.g., layer, film, region, component, sections, or the like) is referred to as being "between" at least two elements, the element may be the only element between the at least two elements, or one or more intervening elements may also be present.

In one or more aspects, the phrases "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise.

The term "or" means "inclusive or" rather than "exclusive or." For example, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

Features of various aspects of the present disclosure may be partially or entirely coupled to or combined with each other, may be technically associated with each other, and may be variously inter-operated, linked or driven together. The aspects of the present disclosure may be implemented or carried out independently of each other, or may be implemented or carried out together in a co-dependent or related relationship. In one or more aspects, the components of each apparatus according to various aspects of the present disclosure are operatively coupled and configured.

Unless otherwise defined, the terms (including technical and scientific terms) used herein have the same meaning as commonly understood by one of ordinary skill in the art to which example aspects belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example aspects.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

In the present disclosure, examples of a "display apparatus" may include a display apparatus such as a display module including a display panel and a driver for driving the display panel. Also, examples of the display module may include a set device (or a set apparatus) or a set electronic device such as a notebook computer, a television (TV), a computer monitor, an equipment apparatus including an automotive apparatus or another type apparatus for vehicles, or a mobile electronic device such as a smartphone or an electronic pad, which is a complete product (or a final product) including a display module such as a liquid crystal display module or a light emitting display module (for example, an organic light emitting display module).

Therefore, in the present disclosure, examples of a display apparatus may include a display apparatus itself, such as a liquid crystal display module or an organic light emitting display module, and a set device which is a final consumer device or an application product including a liquid crystal display module or an organic light emitting display module.

A display panel used in one or more aspects of the present disclosure may use all types of display panels such as a liquid crystal display panel, an organic light emitting display panel, a mini light emitting diode display panel, and a micro light emitting diode display panel, but aspects of the present disclosure are not limited thereto. A display panel according to an embodiment of the present disclosure is not limited to a specific display panel. As an example, a display panel may be bezel-bent in a lower back plate supporting structure and/or a flexible substrate for OLED display panels, without being limited thereto. As an example, the display panel may have a bezel not bent to the lower back plate and/or the flexible substrate, and/or may be a rigid or flexible display panel. For example, a display panel may be a display panel which may sense a touch or pressure (or force) of a user by a sensor driving circuit according to an aspect of the present disclosure. Also, a shape or a size of a display panel applied to a display apparatus according to an aspect of the present aspect is not limited.

According to one or more aspects of the present disclosure, when a display panel is a liquid crystal display panel, the display panel may include a plurality of gate lines, a plurality of data lines, and a plurality of pixels provided in a plurality of pixel areas defined by intersections of the plurality of gate lines and the plurality of data lines. Also, the display panel may include a first substrate including a thin film transistor (TFT) which is a switching element for adjusting a light transmittance in each of the plurality of pixels, a second substrate including a color filter and/or a black matrix, and a liquid crystal layer between the first substrate and the second substrate.

When a display panel is an organic light emitting display panel, the display panel may include a plurality of gate lines, a plurality of data lines, and a plurality of pixels respectively provided in a plurality of pixel areas defined by intersections of the plurality of gate lines and the plurality of data lines. Also, the display panel may include a substrate including a TFT which is an element for selectively applying a voltage to each of the pixels, an organic light emitting device layer on the substrate, and an encapsulation layer (or an encapsulation substrate) disposed on the substrate to cover the organic light emitting device layer. The encapsulation substrate may protect the TFT and the organic light emitting device layer from an external impact and may prevent or reduce water or oxygen from penetrating into the organic light emitting device layer. Also, the organic light emitting device layer may include an inorganic light emitting layer (for example, a nano-sized material layer and/or a quantum dot emission layer). As another example, the organic light emitting device layer may be replaced with a micro light emitting diode (micro-LED) or a mini light emitting diode (mini-LED).

In present disclosure, a display apparatus including a vibration apparatus may be implemented with a user interface device such as a central control panel in automobiles, and thus, may be applied to vehicles.

Features of various aspects of the present disclosure may be partially or overall coupled to or combined with each other, and may be variously inter-operated with each other and driven technically as those skilled in the art can sufficiently understand. The aspects of the present disclosure may be carried out independently from each other, or may be carried out together in co-dependent relationship.

In the following description, various example aspects of the present disclosure are described in detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings may be different from an actual scale, dimension, size, and thickness, and thus, aspects of the present disclosure are not limited to a scale, dimension, size, and thickness illustrated in the drawings. Further, all the components of each vibration apparatus and each display apparatus having the vibration apparatus according to all embodiments of the present disclosure are operatively coupled and configured.

Figure 2:
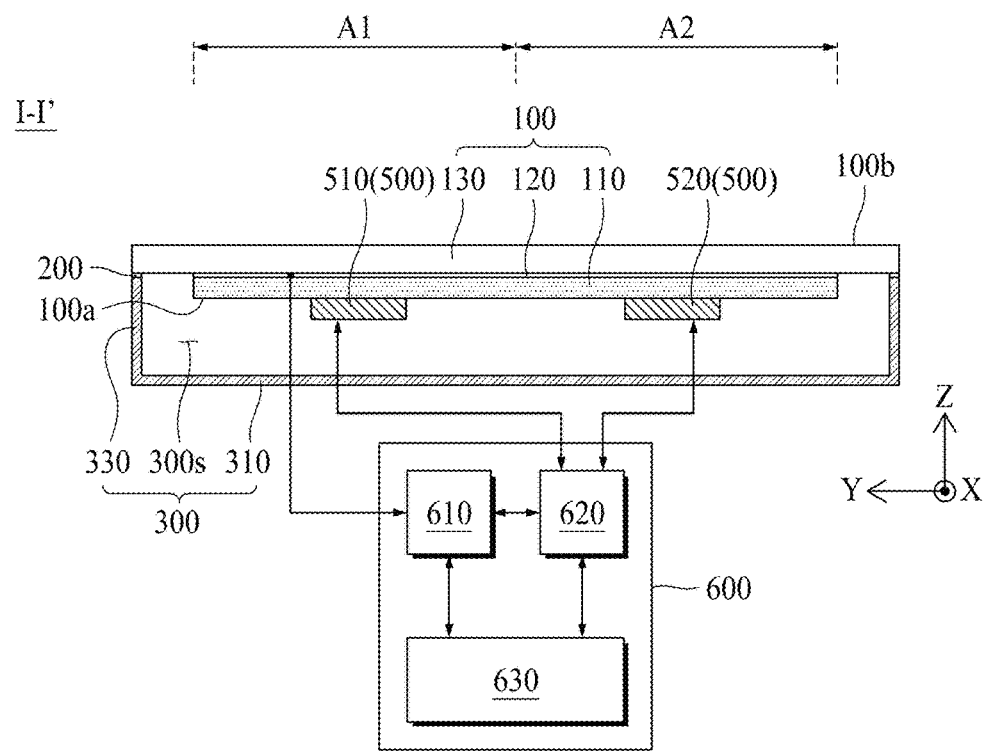
FIG. 2 illustrates a vibration driving circuit and a cross-sectional surface taken along line I-I' illustrated in FIG. 1 according to an aspect of the present disclosure.

FIG. 1 is a perspective view illustrating a display apparatus according to an aspect of the present disclosure. FIG. 2 illustrates a vibration driving circuit and a cross-sectional surface taken along line I-I' illustrated in FIG. 1 according to an aspect of the present disclosure.

As illustrated in FIGS. 1 and 2, the display apparatus according to an aspect of the present disclosure may be configured to sense one or more of a finger touch based on a finger 10 and a touch based on a touch pen (or a stylus pen). For example, the display apparatus according to an aspect of the present disclosure may be a display apparatus to which a touch panel is added or a display apparatus with a touch screen integrated therein. For example, the display apparatus according to an aspect of the present disclosure may be used as a mobile electronic device, such as a mobile phone, a smartphone, a smart watch, a tablet personal computer (PC), or a watch phone, or a display apparatus such as a smart television (TV), an electronic bulletin board, a bidirectional information transfer transparent display, a bidirectional digital signage, a notebook computer, a monitor, or a refrigerator, but aspects of the preset disclosure are not limited thereto.

The display apparatus according to an aspect of the present disclosure may include a display member 100, a vibration apparatus 500, and a vibration driving circuit 600.

The display member 100 may be configured to display an image and may provide a user interface which senses a touch of a user to recognize a user input and provides the user with a haptic feedback vibration, based on a vibration of the vibration apparatus 500. For example, the display member 100 may be used as a vibration plate of the vibration apparatus 500.

The display member 100 may include a display panel 110 and a touch panel 120.

The display panel 110 may be configured to display an image. For example, the display panel 110 may include a plurality of pixels which are configured to display an image. The image may include an electronic image, a digital image, a still image, or a video image. For example, the display panel 110 may include an organic light emitting display panel including a plurality of pixels displaying a black or color image, but the kind of display panel is not limited thereto. For example, the display panel 110 may include a liquid crystal display panel, an electrophoresis display panel, a micro light emitting diode display panel, a mini light emitting diode display panel, an electro-wetting display panel, or a quantum dot light emitting display panel. Hereinafter, an example where the display panel 10 is an organic light emitting display panel will be described, but aspects of the preset disclosure are not limited thereto.

The organic light emitting display panel may include a base substrate, a display part, and a plate member.

The base substrate may include one or more of a glass material and a plastic material, but aspects of the preset disclosure are not limited thereto. The display part may include a pixel array part including a plurality of pixels provided in a plurality of pixel areas defined by a plurality of gate lines and/or a plurality of data lines. Each of the plurality of pixels may include an organic emission layer. The plate member may be configured to cover the display part. The plate member may be attached on the display part by an adhesive member. The plate member may protect the display part or the display panel from an external impact and may prevent or reduce external oxygen, water or moisture from penetrating into a self-emitting device layer.

The display panel 110 according to an aspect of the present disclosure may further include an encapsulation layer. The encapsulation layer may be disposed between the display part and the adhesive member to directly surround the display part. The encapsulation layer may be configured to prevent or reduce external oxygen, water or moisture from penetrating into the light emitting device layer. The encapsulation layer may be provided as an inorganic material layer or an organic material layer, or may be formed in a structure where an inorganic material layer and an organic material layer are alternately stacked, but aspects of the preset disclosure are not limited thereto. For example, the encapsulation layer may be omitted based on a structure of the display panel.

The touch panel (or a touch screen) 120 may be configured to sense a user touch applied to the display member 100. For example, the touch panel 120 may be configured to sense a user touch based on the touch pen or the finger 10. The touch panel 120 may be coupled, connected or integrated with the display panel 110. For example, the display panel 110 may be an organic light emitting display panel with a touch screen integrated therein.

The touch panel 120 according to an aspect of the present disclosure may be configured to cover a front surface of the display panel 110. For example, the touch panel 120 may be disposed to cover a front surface of the plate member or a front surface of the base substrate of the display panel 110.

According to another aspect of the present disclosure, the touch panel 120 may be provided between the display part and the plate member of the display panel 110, but aspects of the preset disclosure are not limited thereto. For example, the touch panel 120 may be disposed in the pixel array part of the display panel 110, and in this case, the touch panel 120 may be an in-cell touch panel, a touch electrode layer, or a touch sensor layer, but aspects of the preset disclosure are not limited thereto. For example, the touch panel 120 may include an electrode structure corresponding to a mutual-capacitance type, which is configured so that a plurality of touch driving electrodes intersect with a plurality of touch sensing electrodes, or a self-capacitance type which is configured with only a plurality of touch sensing electrodes.

The display member 100 according to an aspect of the present disclosure may further include a front member 130 which is at a front surface of the display panel 110.

The front member 130 may configure a foremost structure with respect to the display apparatus and may protect a screen of the display panel 110. The front member 130 may be disposed at the front surface of the display panel 110. For example, the front member 130 may cover the front surface (or the screen) of the display panel 110, and thus, may protect the display panel 110 and the touch panel 120 from an external impact such as an external force applied to the display apparatus when it is dropped or by a user. For example, the front member 130 may be disposed at the front surface of the touch panel 120. For example, the touch panel 120 may be disposed between the front member 130 and the display panel 110. For example, the touch panel 120 may be connected with or attached on a rear surface of the front member 130.

The front member 130 according to an aspect of the present disclosure may include a transparent plastic material, a glass material, or a tempered glass material, but aspects of the present disclosure are not limited thereto. For example, the front member 130 may be a front structure, a front window, a cover window, a glass window, a cover screen, a screen cover, or window glass, but aspects of the present disclosure are not limited to the terms.

The display apparatus according to an aspect of the present disclosure may further include a supporting member 300. The supporting member 300 may be configured or disposed at the rear surface 100a of the display member 100 or the display panel 110. The supporting member 300 may be configured to cover or surround the rear surface 100a of the display member 100 or the display panel 110.

The supporting member 300 may include an internal space 300s which covers the rear surface 100a of the display member 100 or the display panel 110. For example, the supporting member 300 may include a box shape where one side (or an upper side) of the internal space 300s is opened. The internal space 300s may be referred to as a gap space, an air gap, an accommodating space, a vibration space, or a sounding box, but aspects of the present disclosure are not limited thereto.

The supporting member 300 according to an aspect of the present disclosure may include a first supporting portion 310 and a second supporting portion 330.

The first supporting portion 310 may be configured or disposed at the rear surface 100a of the display member 100. For example, the first supporting portion 310 may be configured to cover the rear surface 100a of the display member 100. For example, the first supporting portion 310 may be configured to entirely cover the rear surface 100a of the display panel 110. The first supporting portion 310 may be spaced apart from the rear surface 100a of the display member 100 or the display panel 110. For example, the first supporting portion 310 may be spaced apart from the rear surface 100a of the display member 100 or the display panel 110 with the internal space 300s formed therebetween. For example, the first supporting portion 310 may be a bottom portion, a bottom plate, a supporting plate, a housing plate, or a housing bottom portion, the aspects of the present disclosure are not limited thereto.

The second supporting portion 330 may be configured or disposed at an edge (or a periphery) of the display member 100. For example, the second supporting portion 330 may be configured or disposed at an edge (or a periphery) of the rear surface 100a of the display member 100. For example, the second supporting portion 330 may be connected with an edge portion (or a periphery portion) of the first supporting portion 310. For example, the second supporting portion 330 may include a structure where the edge portion (or the periphery portion) of the first supporting portion 310 is bent. For example, the second supporting portion 330 may be a lateral portion, a sidewall, a supporting sidewall, a housing lateral surface, or a housing sidewall, the aspects of the present disclosure are not limited thereto.

The second supporting portion 330 may be provided as one body with the first supporting portion 310. For example, the first supporting portion 310 and the second supporting portion 330 may be provided as one body, and thus, the internal space 300s surrounded by the second supporting portion 330 may be provided on the first supporting portion 310. Accordingly, the supporting member 300 may include a box shape where one side (or an upper side or an upper portion) is opened by the first supporting portion 310 and the second supporting portion 330.

The display apparatus according to an aspect of the present disclosure may further include a coupling member 200 between the display member 100 and the supporting member 300.

The supporting member 300 may be coupled to or connected with the display member 100 by the coupling member 200. The supporting member 300 may be connected with or coupled to the display member 100 by the coupling member 200. The supporting member 300 may be connected with or coupled to a rear edge portion (or a rear periphery portion) of the display member 100 by the coupling member 200. For example, the supporting member 300 may be connected with or coupled to a rear edge portion (or a rear periphery portion) of the front member 130 by the coupling member 200 and may surround a lateral surface of each of the touch panel 120 and the display panel 110.

According to an aspect of the present disclosure, the front member 130 of the display member 100 may be omitted. In this case, the coupling member 200 may be provided between the display panel 110 and the supporting member 300. For example, when the front member 130 is omitted, the coupling member 200 may be disposed between the rear edge portion (or the rear periphery portion) of the display panel 110 and a front edge portion (or a front periphery portion) of the first supporting portion 310.

The vibration apparatus 500 may be configured at a rear surface of the display member 100. For example, the vibration apparatus 500 may be configured to vibrate the display member 100. For example, the vibration apparatus 500 may vibrate the display member 100 to generate (or output) vibrations of one or more vibration mode shapes. The vibration apparatus 500 may vibrate based on a vibration driving signal applied from the vibration driving circuit 600, and thus, may vibrate the display member 100 to generate (or output) vibrations or haptic vibrations of one or more vibration mode shapes. For example, the vibration apparatus 500 may vibrate the display member 100 to generate (or output) vibrations or haptic vibrations of one or more vibration mode shapes at a surface 100b of the display member 100. For example, when a user touches the surface 100b of the display member 100 with a finger 10 or a touch pen, the vibration apparatus 500 may generate (or output) vibrations or haptic vibrations of one or more vibration mode shapes so that the user recognizes a vibration or a haptic vibration with the finger 10 or the touch pen. For example, the touch pen or the finger 10 of the user may be a haptic object. In the following description, the touch pen or the finger 10 of the user may be a "haptic object 10."

The vibration apparatus 500 according to an aspect of the present disclosure may include a plurality of vibration generating parts 510 and 520, so that the display member 100 vibrates in one or more vibration mode shapes. For example, the one or more vibration mode shapes may be formed based on an interaction of the display member 100 and a vibration of each of the plurality of vibration generating parts 510 and 520. For example, the plurality of vibration generating parts 510 and 520 may include a first vibration generating part 510 and a second vibration generating part 520.

The first vibration generating part 510 and the second vibration generating part 520 may be configured to be connected with a first area A1 and a second area A2 of the display member 100. For example, the first vibration generating part 510 and the second vibration generating part 520 may be respectively connected with the first area A1 and the second area A2 of a rear surface 100a of the display member 100.

In the display member 100, with respect to a first direction X, the first area (or first rear area) A1 may be a left area of the display member 100, and the second area (or second rear area) A2 may be a right area of the display member 100. The display member 100 may include a plurality of haptic areas which respectively overlap or correspond to the first area A1 and the second area A2. For example, when seen from a surface 100b of the display member 100, a plurality of haptic areas may be areas where the left and the right are reversed as a mirror image with respect to the first area A1 and the second area A2. When seen from the surface 100b of the display member 100, a first haptic area (or a first front area) may be a right area of the display member 100, and a second haptic area (or a second front area) may be a left area of the display member 100.

The first vibration generating part 510 may be configured to generate (or output) a vibration in the first area A1 of the display member 100. The first vibration generating part 510 may vibrate based on the vibration driving signal supplied from the vibration driving circuit 600 to vibrate the first area A1 of the vibration driving circuit 600, and thus, may generate (or output) a vibration in the first area A1 of the display member 100. When seen from the surface 100b of the display member 100, a vibration by the first vibration generating part 510 may be output through the right area of the display member 100.

The second vibration generating part 520 may be configured to generate (or output) a vibration in the second area A2 of the display member 100. The second vibration generating part 520 may vibrate based on the vibration driving signal supplied from the vibration driving circuit 600 to vibrate the second area A2 of the vibration driving circuit 600, and thus, may generate (or output) a vibration in the second area A2 of the display member 100. When seen from the surface 100b of the display member 100, a vibration by the second vibration generating part 520 may be output through the left area of the display member 100.

Each of the first vibration generating part 510 and the second vibration generating part 520 may include a piezoelectric material having a piezoelectric characteristic. Each of the first vibration generating part 510 and the second vibration generating part 520 may include a ceramic-based piezoelectric material capable of implementation of a relatively strong vibration, or may include piezoelectric ceramic having a perovskite-based crystalline structure. For example, each of the first vibration generating part 510 and the second vibration generating part 520 may be a vibration device, a vibration generating device, a vibration film, a vibration generating film, a vibrator, a vibration generator, an active vibrator, an active vibration generator, an actuator, an exciter, a film actuator, a film exciter, or an active vibration member, but aspects of the present disclosure are not limited thereto.

Each of the first vibration generating part 510 and the second vibration generating part 520 may autonomously vibrate based on a vibration (or displacement or driving) of a piezoelectric material based on the vibration driving signal applied to a piezoelectric material. Each of the first vibration generating part 510 and the second vibration generating part 520 may alternately and repeatedly perform contraction and/or expansion based on a piezoelectric effect (or piezoelectric characteristic) to vibrate (or displace or drive). For example, each of the first vibration generating part 510 and the second vibration generating part 520 may alternately and repeatedly perform contraction and/or expansion based on an inverse piezoelectric effect to vibrate (or displace or drive) in a first vibration mode shape or a second vibration mode shape. For example, the first vibration mode shape may be a secondary vibration mode shape including two vibration center portions, and the second vibration mode shape may be a tertiary vibration mode shape including three vibration center portions, but aspects of the present disclosure are not limited thereto.

Each of the first vibration generating part 510 and the second vibration generating part 520 may be adhered to or connected with the rear surface 100a of the display member 100 by an adhesive member. For example, each of the first vibration generating part 510 and the second vibration generating part 520 may be adhered to or connected with the rear surface 100a of the display member 100 by an adhesive member. For example, the adhesive member may be a double-sided tape, a double-sided adhesive, an adhesive, a bond, or a thermo-curable resin, but aspects of the present disclosure are not limited thereto. For example, the adhesive member may include one or more of a thermo-curable adhesive, a photo-curable adhesive, and a thermal bonding adhesive. For example, the adhesive member may include a thermal bonding adhesive. The thermal bonding adhesive may be a heat-active type or a thermo-curable type. For example, the adhesive member including the thermal bonding adhesive may attach or couple each of the first vibration generating part 510 and the second vibration generating part 520 on or to the display member 100 by heat and pressure. For example, the adhesive member including the thermal bonding adhesive may minimize or reduce the loss of a vibration of each of the first vibration generating part 510 and the second vibration generating part 520.

The vibration driving circuit 600 according to an aspect of the present disclosure may include a touch sensing part 610, a vibration driver 620, and a vibration controller 630.

The touch sensing part 610 may be electrically connected with the touch panel 120, and thus, may drive all or some of a plurality of touch electrodes disposed in the touch panel 120, sense all or some of the plurality of touch electrodes to receive a touch sensing signal, sample the received touch sensing signal to generate touch sensing data, and output the touch sensing signal or touch sensing data. The touch sensing signal or the touch sensing data of the touch sensing part 610 may be provided to the vibration controller 630. For example, the touch sensing signal may be analog information such as a voltage signal, and the touch sensing data may be digital information converted into a digital form, but aspects of the present disclosure are not limited thereto.

The vibration controller 630 may detect touch coordinates (or position or area) and/or whether the surface 100b of the display member 100 is touched by the haptic object 10, based on the touch sensing signal or the touch sensing data. According to another aspect of the present disclosure, the touch sensing part 610 may include a processor which may determine or control the touch coordinates (or position or area) and/or whether the display member 100 is touched by the haptic object 10, based on the touch sensing signal or the touch sensing data. The touch sensing part 610 may provide the vibration controller 630 with the touch coordinates (or position or area) and/or whether the display member 100 is touched by the haptic object 10, but aspects of the present disclosure are not limited thereto.

The vibration driving driver (or vibration driving portion) 620 may be electrically connected with each of the first vibration generating part 510 and the second vibration generating part 520 and may apply the vibration driving signal to the first vibration generating part 510 and the second vibration generating part 520 to vibrate the first vibration generating part 510 and the second vibration generating part 520.

The vibration controller 630 may control an operation of the vibration driver 620, based on touch coordinates (or position or region) of the haptic object 10 sensed by the touch sensing part 610. The vibration driver 620 may generate the vibration driving signal, based on control by the vibration controller 630, and may provide the vibration driving signal to each of the first vibration generating part 510 and the second vibration generating part 520. For example, the vibration controller 630 may control the vibration driver 620 so that the vibration driving signal is generated on system notification (for example, low battery, memory deficiency, security notification, etc.), message or telephone reception, program notification, in addition to a touch operation, but aspects of the present disclosure are not limited thereto. A detailed driving method of the vibration driving circuit 600 according to an aspect of the present disclosure will be described below with reference to FIGS. 6 to 16.

Figure 3:
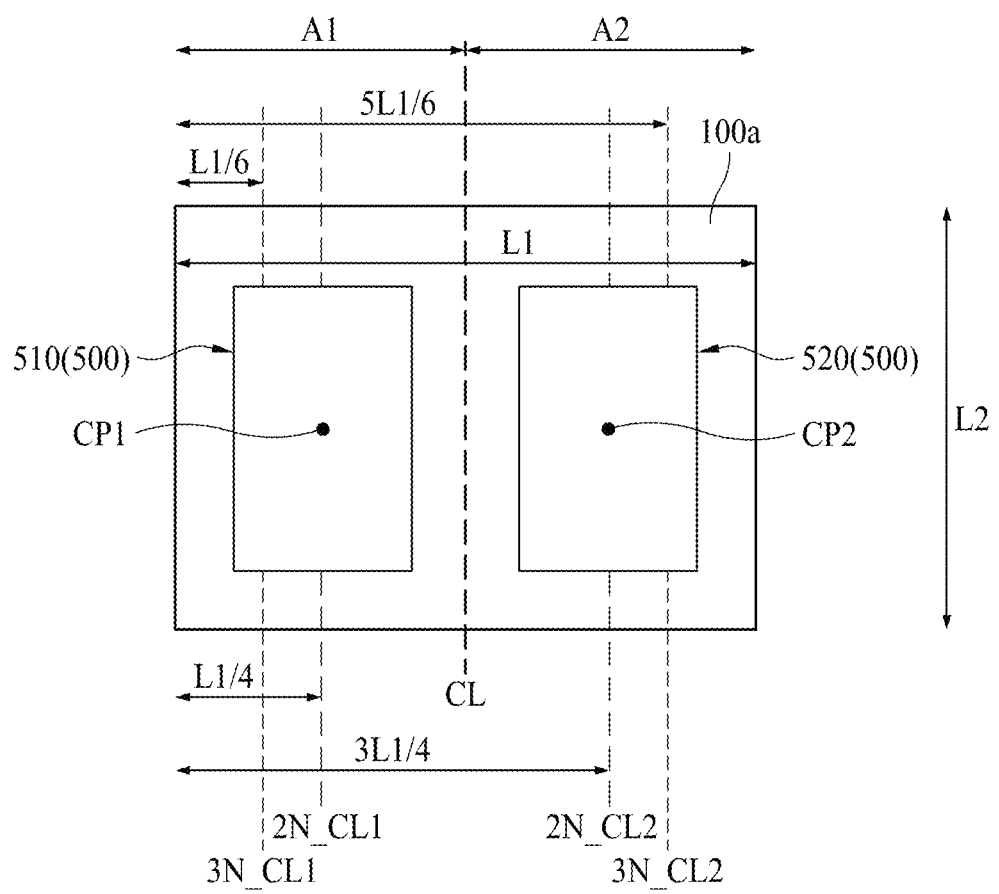
FIG. 3 is a plan view illustrating a vibration apparatus provided in a display apparatus according to an aspect of the present disclosure.
Figure 4:
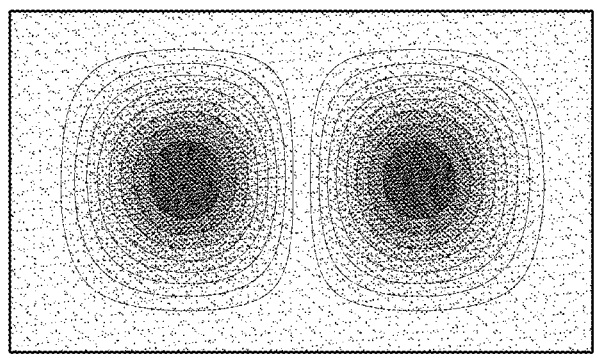
FIGS. 4 and 5 illustrate vibration intensity based on a vibration mode of the vibration apparatus illustrated in FIG. 3 according to an aspect of the present disclosure.
Figure 5:
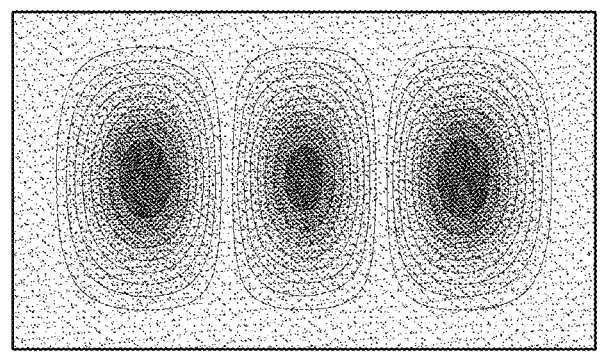

FIG. 3 is a plan view illustrating a vibration apparatus provided in a display apparatus according to an aspect of the present disclosure. FIGS. 4 and 5 illustrate vibration intensity based on a vibration mode of the vibration apparatus illustrated in FIG. 3 according to an aspect of the present disclosure.

As shown in FIGS. 3 to 5, a vibration apparatus 500 according to an aspect of the present disclosure may include a display member or a vibration member 100, a first vibration generating part 510, and a second vibration generating part 520.

The display member or the vibration member 100 may vibrate in one or more vibration mode shapes, based on driving (or driving or displacement) of the first vibration generating part 510 and the second vibration generating part 520. For example, the display member or the vibration member 100 may vibrate in one or more vibration mode shapes illustrated in FIGS. 4 and 5. The one or more vibration mode shapes may be formed based on an interaction of the display member or the vibration member 100 and a vibration of each of the first vibration generating part 510 and the second vibration generating part 520. For example, the one or more vibration mode shapes may include a first vibration mode shape and a second vibration mode shape. The first vibration mode shape and the second vibration mode shape may differ in number and positions of vibration center portions defining points at which the intensities of vibrations are high. As illustrated in FIG. 4, the first vibration mode shape may be a secondary vibration mode shape including two vibration center portions. Also, as illustrated in FIG. 5, the second vibration mode shape may be a tertiary vibration mode shape including three vibration center portions. FIGS. 4 and 5 illustrate vibration intensities, and a shadow represents the degree of vibration intensity. For example, as a shadow is deepened, vibration intensity may increase. For example, vibration intensity may increase progressively toward a black shadow from a shadow of a dotted line. As illustrated in FIG. 4, a portion where a shadow is deep may be a portion where vibration intensity is high, and a portion where vibration intensity is high may be a vibration center portion. Therefore, a vibration mode shape may be a secondary vibration mode shape including two vibration center portions. As shown in FIG. 5, a portion where a shadow is deep may be a portion where vibration intensity is high, and a portion where vibration intensity is high may be a vibration center portion. Therefore, a vibration mode shape may be a tertiary vibration mode shape including three vibration center portions.

A rear surface 100a of the vibration member 100 or the display member may include a first area A1 and a second area A2. The first vibration generating part 510 and the second vibration generating part 520 may be disposed in or connected with the rear surface 100a of the vibration member 100 or the display member. For example, the rear surface 100a of the vibration member 100 or the display member may include the first area A1 and the second area A2, with respect to a center line CL. The first area A1 may be a left area with respect to the center line CL, and the second area A2 may be a right area with respect to the center line CL.

The rear surface 100a of the vibration member 100 or the display member may include a first length L1 and a second length L2. For example, the first length L1 may be parallel to a horizontal direction. For example, the second length L2 may be parallel to a vertical direction. For example, the rear surface 100a of the vibration member 100 or the display member may include a tetragonal shape which has the first length L1 parallel to the horizontal direction and the second length L2 parallel to the vertical direction. For example, the rear surface 100a of the vibration member 100 or the display member may include a square shape where the first length L1 and the second length L2 are equal to each other, or may include a rectangular shape where the first length L1 is longer than the second length L2, but aspects of the present disclosure are not limited thereto.

Each of the first vibration generating part 510 and the second vibration generating part 520 may be disposed or configured at the rear surface 100a of the vibration member 100 or the display member. For example, the first vibration generating part 510 may be disposed or configured at the rear surface 100a of the vibration member 100 or the display member. Also, the second vibration generating part 520 may be disposed or configured in the second area A2 of the rear surface 100a of the vibration member 100 or the display member.

Each of the first vibration generating part 510 and the second vibration generating part 520 may be disposed or configured to overlap a vibration center portion of each of one or more vibration mode shapes. For example, the one or more vibration mode shapes may include a first vibration mode shape and a second vibration mode shape.

The first vibration mode shape may be a secondary vibration mode shape including two vibration center portions, and first vibration center portions 2N_CL1 and 2N_CL2 of the first vibration mode shape may be disposed one-by-one in each of the first area A1 and the second area A2 of the rear surface 100a of the vibration member 100 or the display member. For example, the first vibration center portion 2N_CL1 may be disposed in the first area A1 of the rear surface 100a of the vibration member 100 or the display member. For example, the first vibration center portion 2N_CL1 disposed in the first area A1 may be disposed at a point corresponding to L1/4 with respect to the first length L1 of the rear surface 100a of the vibration member 100 or the display member, but aspects of the present disclosure are not limited thereto. For example, L1/4 may be a distance to a center portion CP1 of the first vibration generating part 510 disposed in the first area A1 at an edge (or a periphery) of the rear surface 100a of the vibration member 100 or the display member. Also, the first vibration center portion 2N_CL2 disposed in the second area A2 may be disposed at a point corresponding to 3L1/4 with respect to the first length L1 of the rear surface 100a of the vibration member 100 or the display member, but aspects of the present disclosure are not limited thereto. For example, 3L1/4 may be a distance to a center portion CP2 of the second vibration generating part 520 disposed in the second area A2 at an edge (or a periphery) of the rear surface 100a of the vibration member 100 or the display member.

The second vibration mode shape may be a tertiary vibration mode shape including three vibration center portions, and two second vibration center portions 3N_CL1 and 3N_CL2 of the three vibration center portions of the second vibration mode shape may be disposed one-by-one in each of the first area A1 and the second area A2 of the rear surface 100a of the vibration member 100 or the display member. For example, the second vibration center portion 3N_CL1 may be disposed in the first area A1 of the rear surface 100a of the vibration member 100 or the display member. For example, the second vibration center portion 3N_CL1 disposed in the first area A1 may be disposed at a point corresponding to L1/6 with respect to the first length L1 of the rear surface 100a of the vibration member 100 or the display member, but aspects of the present disclosure are not limited thereto. For example, L1/6 may be a distance to the second vibration center portion 3N_CL1 disposed in the first area A1 at the edge (or the periphery) of the rear surface 100a of the vibration member 100 or the display member. Also, the second vibration center portion 3N_CL2 disposed in the second area A2 may be disposed at a point corresponding to 5L1/6 with respect to the first length L1 of the rear surface 100a of the vibration member 100 or the display member, but aspects of the present disclosure are not limited thereto. For example, 5L1/6 may be a distance to the second vibration center portion 3N_CL2 disposed in the second area A2 at the edge (or the periphery) of the rear surface 100a of the vibration member 100 or the display member.

Each of the first vibration generating part 510 and the second vibration generating part 520 may be disposed or configured to overlap at least one of the first vibration center portions 2N_CL1 and 2N_CL2 of the first vibration mode shape and the second vibration center portions 3N_CL1 and 3N_CL2 of the second vibration mode shape.

The center portion CP1 of the first vibration generating part 510 may be disposed or configured to overlap the first vibration center portion 2N_CL1. Also, the first vibration generating part 510 may be disposed or configured to overlap the second vibration center portion 3N_CL1. For example, the first vibration generating part 510 may be disposed or configured to overlap the first vibration center portion 2N_CL1 and the second vibration center portion 3N_CL1.

The center portion CP2 of the second vibration generating part 520 may be disposed or configured to overlap the first vibration center portion 2N_CL2. Also, the second vibration generating part 520 may be disposed or configured to overlap the second vibration center portion 3N_CL2. For example, the second vibration generating part 520 may be disposed or configured to overlap the first vibration center portion 2N_CL2 and the second vibration center portion 3N_CL2.

In addition, although an outline of each of the plurality of vibration generating parts 510 and 520 is shown as being rectangular by example, the shapes thereof need not be limited. Variations of the shapes of the plurality of vibration generating parts 510 and 520 may be used, and the shapes of the plurality of vibration generating parts 510 and 520 may be independent of each other, and may have either the same shape or a different shape, and such shapes may be based on desire for enhancing a vibration characteristic of a low frequency band, or arrangement for three dimensional sound or other acoustic characteristics.

Although shown with at least two vibration generating parts 510 and 520 by way of example, the number of utilized vibration generating parts may be multiple for each vibration apparatus. Additionally, when multiple vibration apparatus are used, each vibration apparatus needs not have the same number of vibration generating parts, but may have different numbers of vibration generating parts depending on desire for enhancing a vibration characteristic of a low frequency band, or arrangement for three dimensional sound or other acoustic characteristics.

Figure 6:
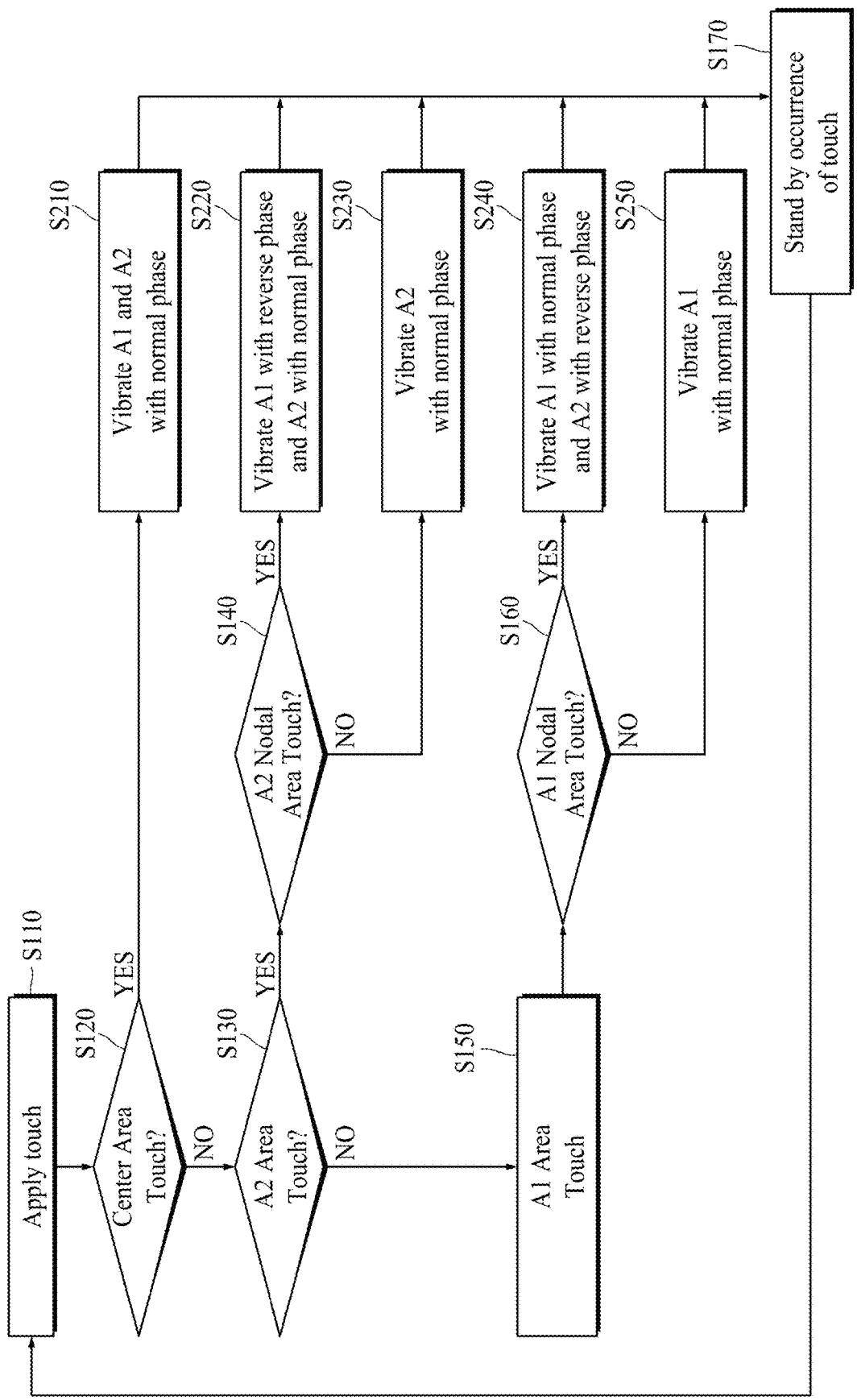
FIG. 6 is a flowchart illustrating a driving method of a vibration apparatus according to an aspect of the present disclosure.

FIG. 6 is a flowchart illustrating a driving method of a vibration apparatus according to an aspect of the present disclosure. FIGS. 7 to 16 illustrate various examples for describing the driving method of the vibration apparatus illustrated in FIG. 6 according to an aspect of the present disclosure. When seen from a rear surface 100a of a display member 100, FIGS. 7, 9, 11, 13, and 15 illustrate a touch T position of a haptic object 10. When seen from the rear surface 100a of the display member 100, FIGS. 8, 10, 12, 14, and 16 illustrate vibration intensity, and a shadow and a numerical value represent the degree of vibration intensity. For example, a shadow may be deep at a point at which a shadow is weak and a numerical value is small, and as a numerical value increases, vibration intensity may increase.

As illustrated in FIGS. 6 to 16, a vibration apparatus 500 according to an aspect of the present disclosure may be implemented or configured based on control by a vibration driving circuit 600.

At step S110, the vibration driving circuit 600 may recognize that the vibration member or the display member 100 is touched by the haptic object 10. For example, the vibration driving circuit 600 may detect whether a touch is performed by the haptic object 10, based on touch sensing data or a touch sensing signal sensed from a touch panel 120.

Figure 7:
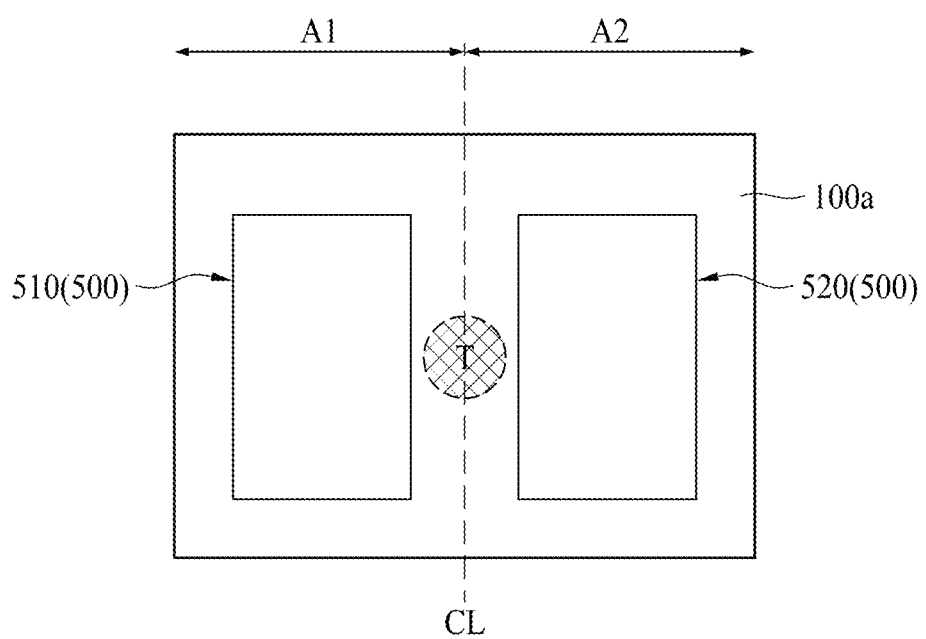
FIGS. 7 to 16 illustrate various examples for describing the driving method of the vibration apparatus illustrated in FIG. 6 according to an aspect of the present disclosure.

At step S120, when a touch occurrence event is checked where a touch of the haptic object 10 on the vibration member or the display member 100 is recognized, the vibration driving circuit 600 may check touch coordinates (or position or area) of the haptic object 10 and may determine whether the touch coordinates are in a center area of a periphery of a center line CL of the vibration member or the display member 100. As illustrated in FIG. 7, when a touch T of the haptic object 10 is in a center area of the periphery of the center line CL of the vibration member or the display member 100, an operation of the vibration driving circuit 600 may be performed at step S210.

Figure 8:
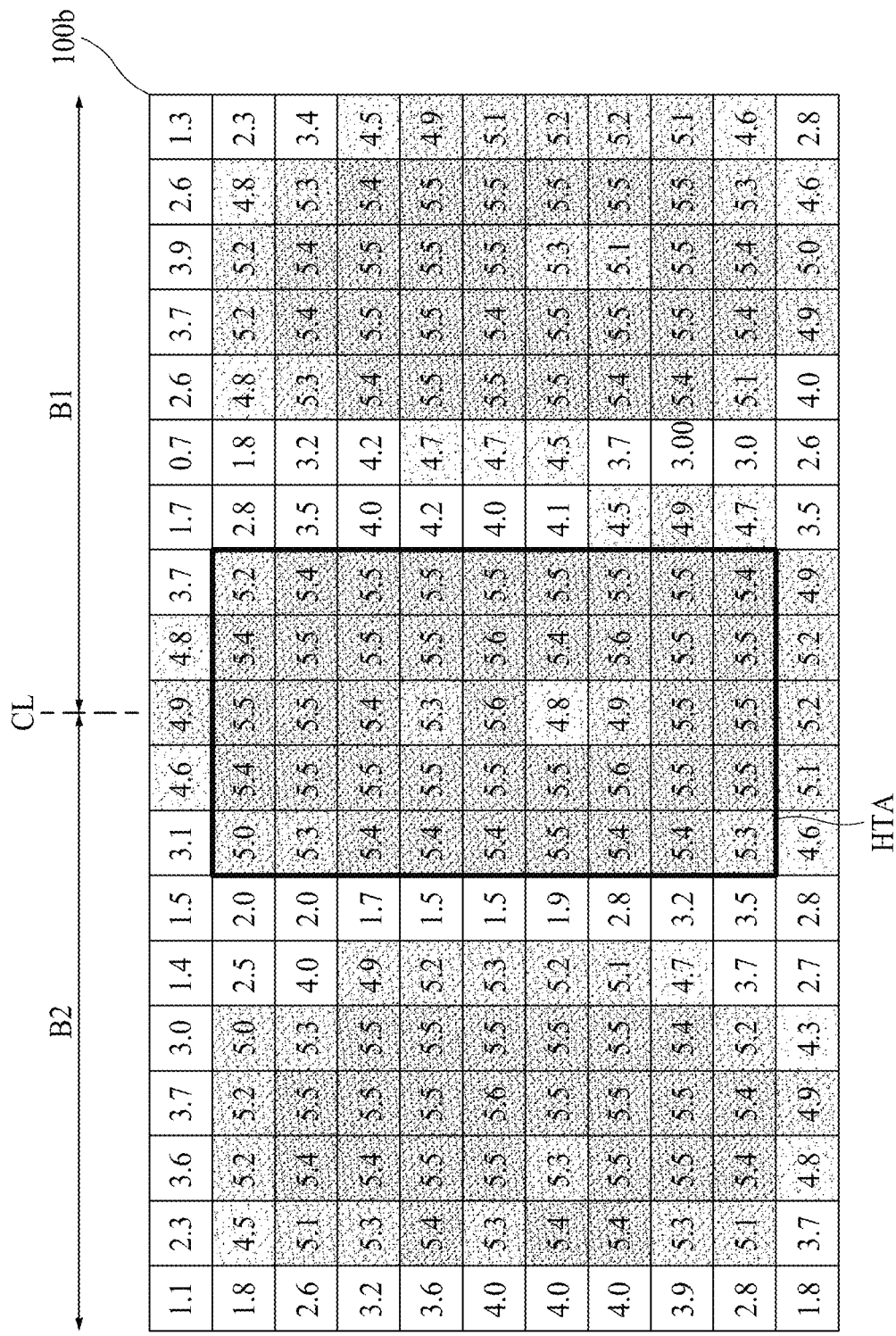

At step S210, the vibration driving circuit 600 may control the vibration driving of the first vibration generating part 510 and the second vibration generating part 520 so that the first area A1 and the second area A2 of the vibration member or the display member 100 vibrate with a normal phase. For example, the first area A1 and the second area A2 of the vibration member or the display member 100 may simultaneously vibrate with a normal phase. Therefore, as illustrated in FIG. 8, a haptic target area HTA at the surface 100b of the vibration member or the display member 100 may be disposed in a center area of a periphery of a center line CL between a first haptic area B1 and a second haptic area B2 of the surface 100b of the vibration member or the display member 100. Vibration intensity represented by a shadow and a numerical value may uniformly vibrate with a numerical value of 4.8 to 5.5 in the haptic target area HTA, and thus, a haptic feedback vibration with no sense of difference may be provided to a user. The vibration intensity of the haptic target area HTA does not limit the descriptions of the present disclosure.

At step S130, when the touch coordinates of the haptic object 10 on the vibration member or the display member 100 is not in the center line CL, the vibration driving circuit 600 may determine whether the touch coordinates are in the second area A2 of the vibration member or the display member 100.

Figure 9:
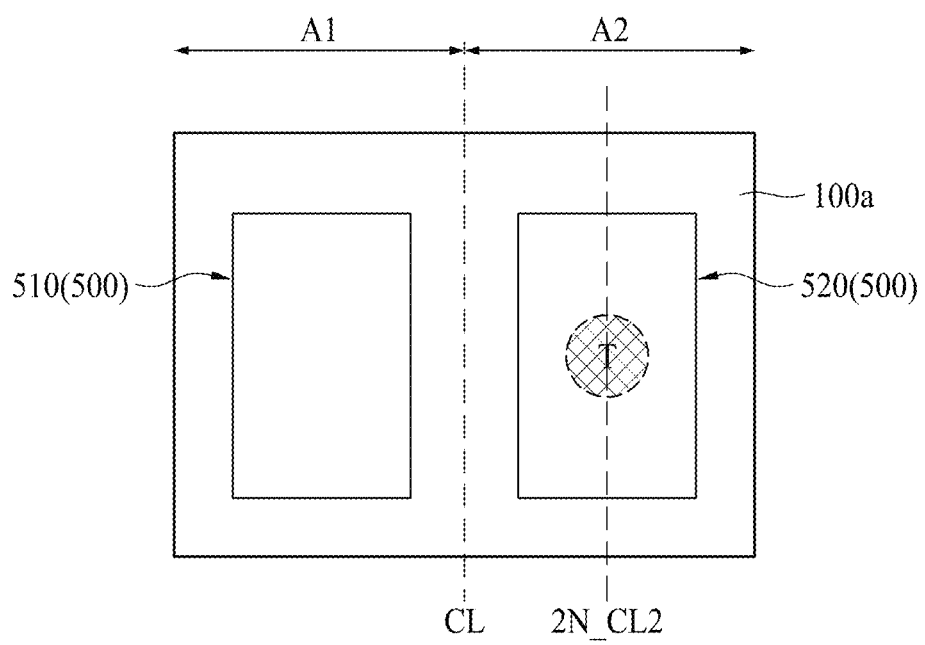
Figure 11:
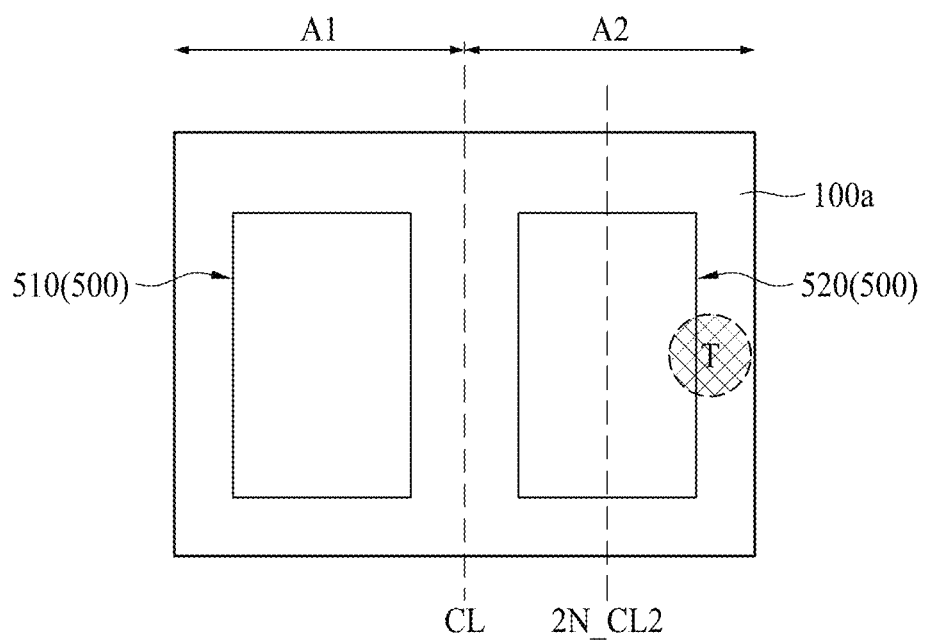

At step S140, when it is checked that the touch coordinates are in the second area A2 of the vibration member or the display member 100, the vibration driving circuit 600 may determine whether the touch coordinates are at the first vibration center portion 2N_CL2 in the second area A2 of the vibration member or the display member 100. As illustrated in FIG. 9, when it is determined that the touch T of the haptic object 10 is at the first vibration center portion 2N_CL2 in the second area A2 of the vibration member or the display member 100, an operation of the vibration driving circuit 600 may be performed at step S220. Alternatively, as illustrated in FIG. 11, when it is determined that the touch T of the haptic object 10 is not at the first vibration center portion 2N_CL2 in the second area A2 of the vibration member or the display member 100, an operation of the vibration driving circuit 600 may be performed at step S230.

Figure 10:
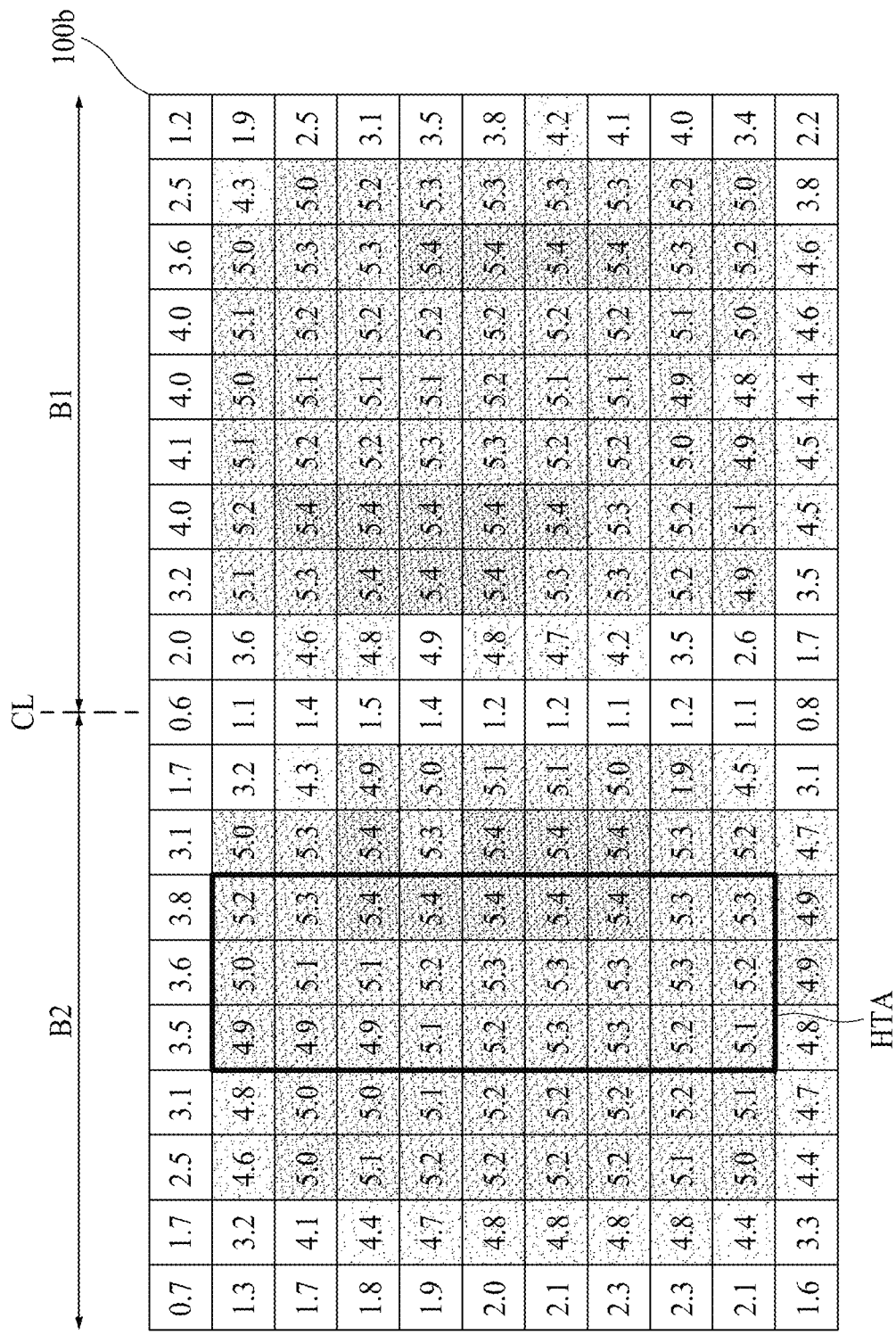

At step S220, the vibration driving circuit 600 may control the vibration driving of the first vibration generating part 510 and the second vibration generating part 520 so that the first area A1 of the vibration member or the display member 100 vibrates with a reverse phase, and the second area A2 of the vibration member or the display member 100 vibrates with a normal phase. For example, a vibration of the first area A1 of the vibration member or the display member 100 based on a reverse phase and a vibration of the second area A2 of the vibration member or the display member 100 based on a normal phase may be simultaneously performed. Therefore, as illustrated in FIG. 10, the haptic target area HTA at the surface 100b of the vibration member or the display member 100 may be disposed at a periphery of the second haptic area B2 of the surface 100b of the vibration member or the display member 100. Vibration intensity represented by a shadow and a numerical value may uniformly vibrate with a numerical value of 4.9 to 5.4 in the haptic target area HTA, and thus, a haptic feedback vibration with no sense of difference may be provided to the user. The vibration intensity of the haptic target area HTA does not limit the descriptions of the present disclosure.

Figure 12:
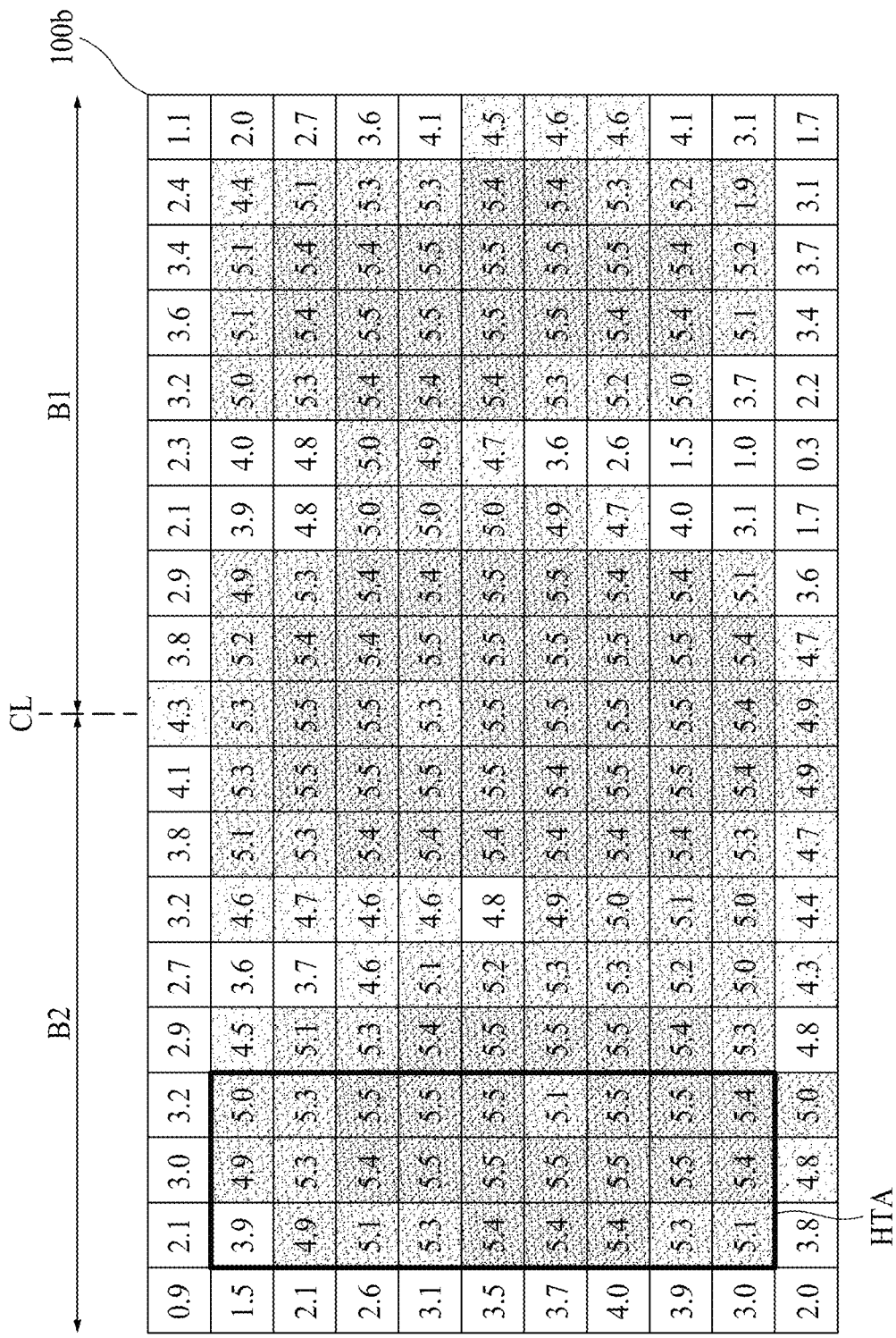

At step S230, the vibration driving circuit 600 may control the vibration driving of the second vibration generating part 520 to apply vibration in a normal phase only to the second area A2 of the vibration member or the display member 100. Therefore, as illustrated in FIG. 12, the haptic target area HTA at the surface 100b of the vibration member or the display member 100 may be disposed at an edge periphery of the second haptic area B2 of the surface 100b of the vibration member or the display member 100. Vibration intensity represented by a shadow and a numerical value may uniformly vibrate with a numerical value of 3.9 to 5.5 in the haptic target area HTA, and thus, a haptic feedback vibration with no sense of difference may be provided to a user. The vibration intensity of the haptic target area HTA does not limit the descriptions of the present disclosure.

At step S150, when the touch coordinates of the haptic object 10 on the vibration member or the display member 100 is not in the center line CL and the second area A2, the vibration driving circuit 600 may determine whether the touch coordinates are in the first area A1 of the vibration member or the display member 100.

Figure 13:
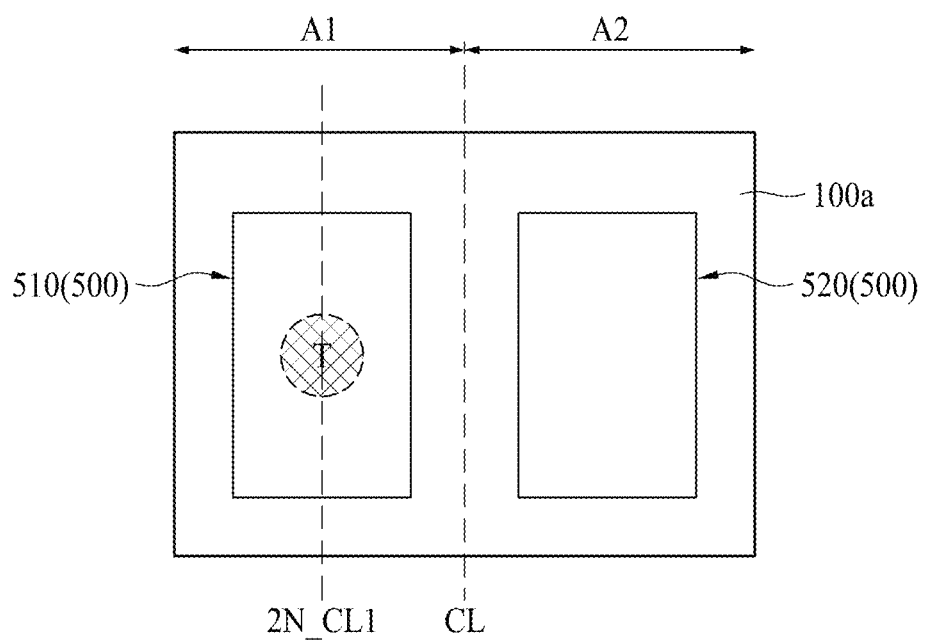
Figure 15:
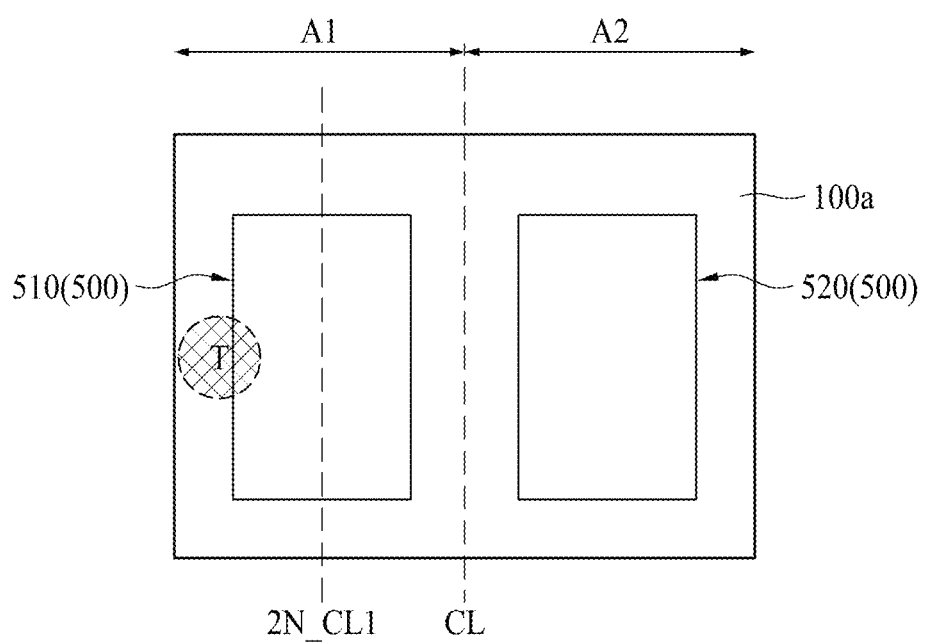

At step S160, when it is checked that the touch coordinates are in the first area A1 of the vibration member or the display member 100, the vibration driving circuit 600 may determine whether the touch coordinates are at the first vibration center portion 2N_CL1 in the first area A1 of the vibration member or the display member 100. As illustrated in FIG. 13, when it is determined that the touch T of the haptic object 10 is at the first vibration center portion 2N_CL1 in the first area A1 of the vibration member or the display member 100, an operation of the vibration driving circuit 600 may be performed at step S240. Alternatively, as illustrated in FIG. 15, when it is determined that the touch T of the haptic object 10 is not at the first vibration center portion 2N_CL1 in the first area A1 of the vibration member or the display member 100, an operation of the vibration driving circuit 600 may be performed at step S250.

Figure 14:
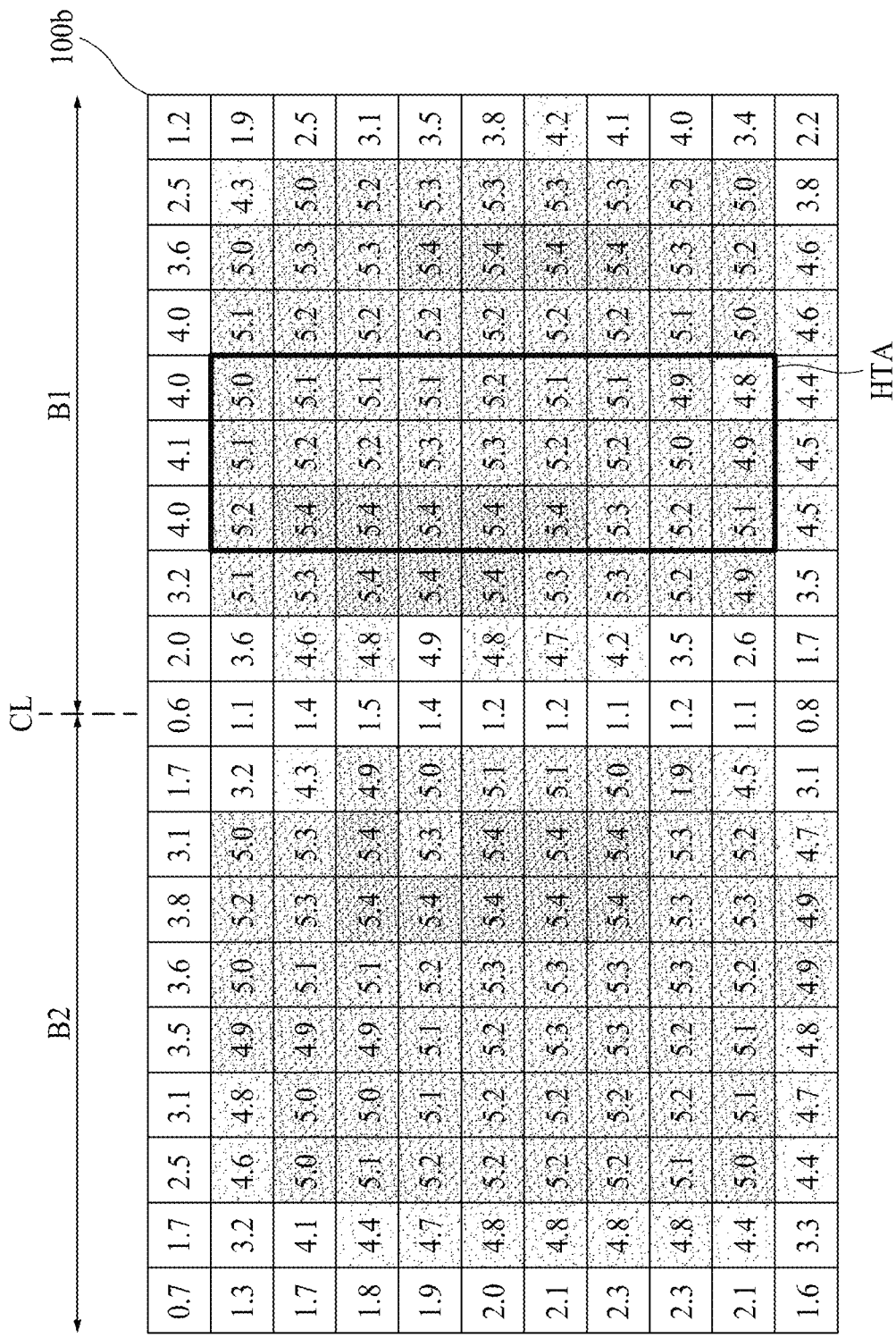

At step S240, the vibration driving circuit 600 may control the vibration driving of the first vibration generating part 510 and the second vibration generating part 520 so that the first area A1 of the vibration member or the display member 100 vibrates with a normal phase, and the second area A2 of the vibration member or the display member 100 vibrates with a reverse phase. For example, a vibration of the first area A1 of the vibration member or the display member 100 based on a normal phase and a vibration of the second area A2 of the vibration member or the display member 100 based on a reverse phase may be simultaneously performed. Therefore, as illustrated in FIG. 14, the haptic target area HTA at the surface 100b of the vibration member or the display member 100 may be disposed at a periphery of the first haptic area B1 of the surface 100b of the vibration member or the display member 100. Vibration intensity represented by a shadow and a numerical value may uniformly vibrate with a numerical value of 4.8 to 5.4 in the haptic target area HTA, and thus, a haptic feedback vibration with no sense of difference may be provided to the user. The vibration intensity of the haptic target area HTA does not limit the descriptions of the present disclosure.

Figure 16:
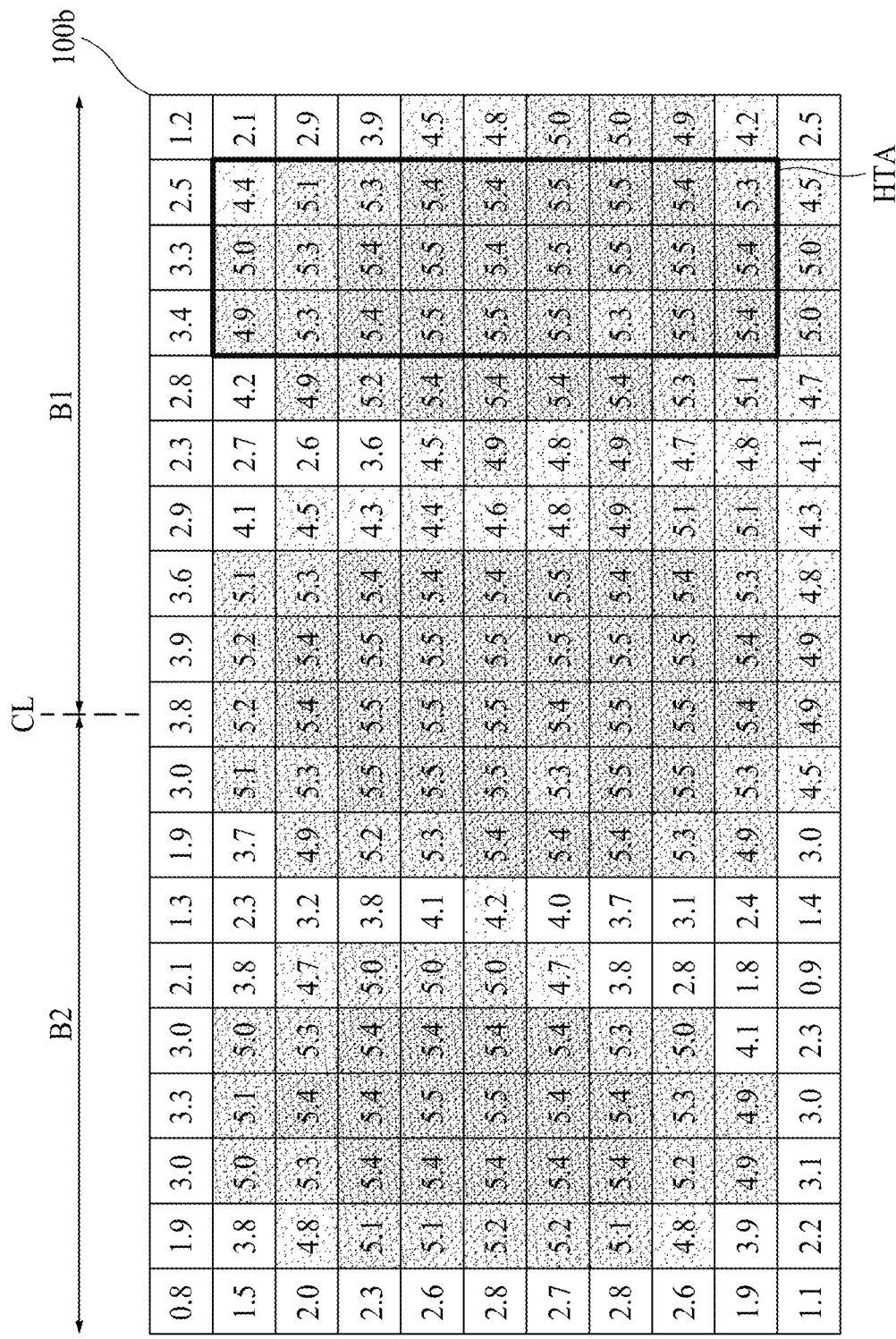

At step S250, the vibration driving circuit 600 may control the vibration driving of the first vibration generating part 510 to apply vibration in a normal phase only to the first area A1 of the vibration member or the display member 100. Therefore, as illustrated in FIG. 16, the haptic target area HTA at the surface 100b of the vibration member or the display member 100 may be disposed at an edge periphery of the first haptic area B1 of the surface 100b of the vibration member or the display member 100. Vibration intensity represented by a shadow and a numerical value may uniformly vibrate with a numerical value of 4.4 to 5.5 in the haptic target area HTA, and thus, a haptic feedback vibration with no sense of difference may be provided to a user. The vibration intensity of the haptic target area HTA does not limit the descriptions of the present disclosure.

At step S170, when a haptic feedback vibration is provided to the vibration member or the display member 100, the vibration driving circuit 600 may monitor whether a touch occurs until a next touch occurs and may maintain a standby state.

Figure 17:
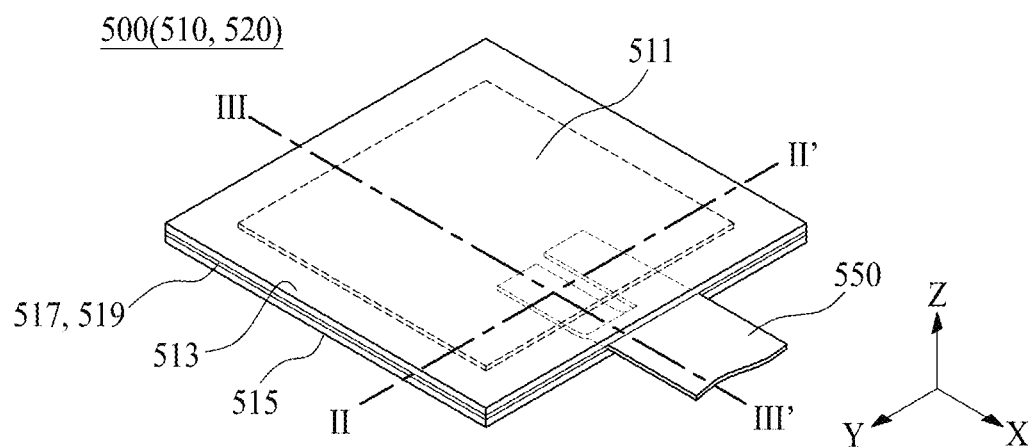
FIG. 17 illustrates a vibration generating part according to an aspect of the present disclosure.
Figure 18:
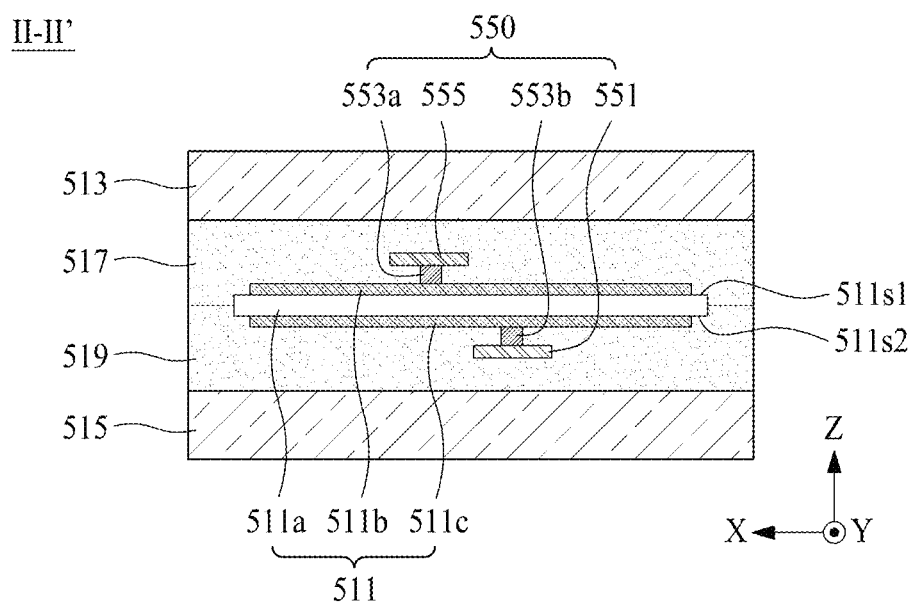
FIG. 18 is a cross-sectional view taken along line II-II' illustrated in FIG. 17 according to an aspect of the present disclosure.
Figure 19:
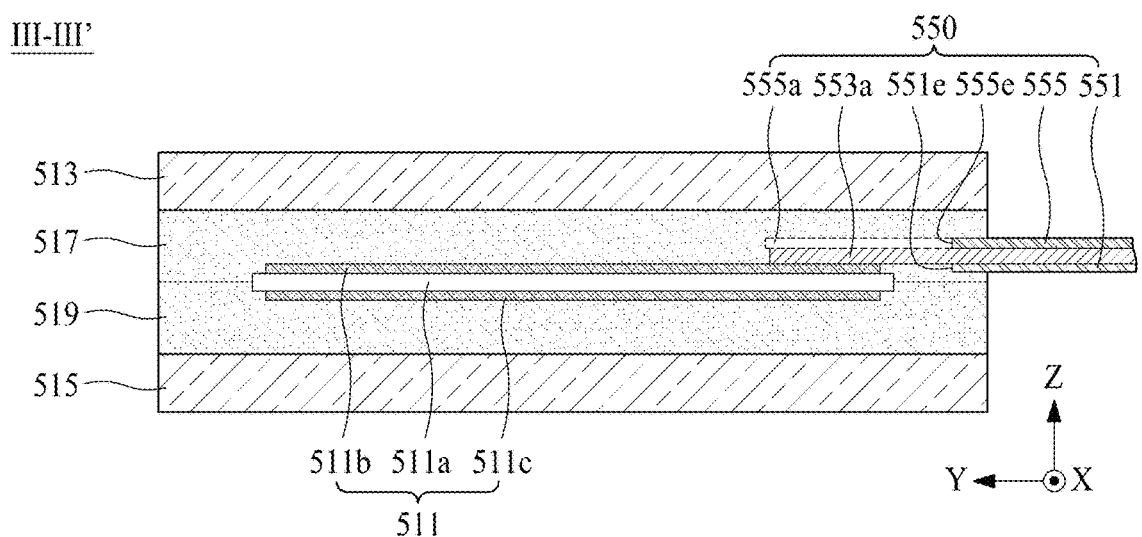
FIG. 19 is a cross-sectional view taken along line III-III' illustrated in FIG. 17 according to an aspect of the present disclosure.

FIG. 17 illustrates a vibration generating part according to an aspect of the present disclosure. FIG. 18 is a cross-sectional view taken along line II-II' illustrated in FIG. 17 according to an aspect of the present disclosure. FIG. 19 is a cross-sectional view taken along line III-III' illustrated in FIG. 17 according to an aspect of the present disclosure. FIGS. 17 to 19 illustrate the vibration generating part of the vibration apparatus described above with reference to FIGS. 1 to 16.

As illustrated in FIGS. 17 to 19, vibration generating parts 510 and 520 of a vibration apparatus 500 according to an aspect of the present disclosure may include a vibration part 511.

The vibration part 511 may be configured to vibrate with a piezoelectric effect based on a driving signal. The vibration part 511 may include at least one of a piezoelectric inorganic material and a piezoelectric organic material. For example, the vibration part 511 may be a vibration device, a piezoelectric device, a piezoelectric device portion, a piezoelectric device layer, a piezoelectric structure, a piezoelectric vibration part, or a piezoelectric vibration layer, but aspects of the present disclosure are not limited thereto.

The vibration part 511 according to an aspect of the present disclosure may include a vibration layer 511a, a first electrode layer 511b, and a second electrode layer 511c.

The vibration layer 511a may include a piezoelectric material or an electroactive material capable of creating a piezoelectric effect. For example, the piezoelectric material may have a characteristic where pressure or twisting is applied to a crystalline structure by an external force, a potential difference occurs due to dielectric polarization caused by a relative position change of a positive (+) ion and a negative (−) ion, and a vibration is generated by an electric field based on a voltage applied thereto. For example, the vibration layer 511a may be referred to as a piezoelectric layer, a piezoelectric material layer, an electro active layer, a piezoelectric composite layer, a piezoelectric composite, or a piezoelectric ceramic composite, but aspects of the present disclosure are not limited thereto.

The vibration layer 511a may include a ceramic-based material for implementing a relatively strong vibration (vibration frequency), or may include a piezoelectric ceramic having a perovskite-based crystalline structure. The perovskite crystalline structure may have a piezoelectric effect and an inverse piezoelectric effect, and may be a plate-shaped structure having orientation.

The piezoelectric ceramic may include single crystalline ceramic having a single crystalline structure, or may include polycrystalline ceramic or a ceramic material having a polycrystalline structure. A piezoelectric material of a single crystalline ceramic may include $\alpha$-AlPO$_4$, $\alpha$-SiO$_2$, LiNbO$_3$, Tb$_2$(MoO$_4$)$_3$, Li$_2$B$_4$O$_7$, or ZnO, but aspects of the present disclosure are not limited thereto. A piezoelectric material of a polycrystalline ceramic may include a lead zirconate titanate (PZT)-based material including lead (Pb), zirconium (Zr), and titanium (Ti) or may include a lead zirconate nickel niobate (PZNN)-based material including lead (Pb), zinc (Zn), nickel (Ni), and niobium (Nb), but aspects of the present disclosure are not limited thereto. For example, the vibration layer 261 may include at least one of CaTiO$_3$, BaTiO$_3$, and SrTiO$_3$ including no Pb, but aspects of the present disclosure are not limited thereto.

The first electrode layer 511b may be disposed at a first surface (or a lower surface or a rear surface) 511s1 of the vibration layer 511a. The first electrode layer 511b may have the same size as that of the vibration layer 511a, or may have a size which is less than that of the vibration layer 511a.

The second electrode layer 511c may be disposed at a second surface (or an upper surface or a front surface) 511s2 which is different from or opposite to the first surface 511s1 of the vibration layer 511a. The second electrode layer 511c may have substantially the same size as that of the vibration layer 511a, or may have a size which is less than that of the vibration layer 511a. For example, the second electrode layer 511c may have substantially the same size as that of the vibration layer 511a, but aspects of the present disclosure are not limited thereto.

According to an aspect of the present disclosure, in order to prevent, avoid or reduce an electrical connection (or short circuit) between the first electrode layer 511b and the second electrode layer 511c, each of the first electrode layer 511b and the second electrode layer 511c may be formed at the other portion, except an edge portion, of the vibration layer 511a. For example, the first electrode layer 511b may be entirely formed at the other portion, except an edge portion, of the first surface 511s1 of the vibration layer 511a. For example, the second electrode layer 511c may be entirely formed at the other portion, except an edge portion, of the second surface 511s2 of the vibration layer 511a. For example, a distance between a lateral surface (or an outer sidewall) of each of the first electrode layer 511b and the second electrode layer 511c and a lateral surface (or an outer sidewall) of the vibration layer 511a may be at least 0.5 mm or more. For example, a distance between the lateral surface of each of the first electrode layer 511b and the second electrode layer 511c and the lateral surface of the vibration layer 511a may be at least 1 mm or more, but aspects of the present disclosure are not limited thereto.

One or more of the first electrode layer 511b and the second electrode layer 511c according to an aspect of the present disclosure may include a transparent conductive material, a semitransparent conductive material, or an opaque conductive material. For example, the transparent or semitransparent conductive material may include indium tin oxide (ITO) or indium zinc oxide (IZO), but aspects of the present disclosure are not limited thereto. The opaque conductive material may include gold (Au), silver (Ag), platinum (Pt), palladium (Pd), molybdenum (Mo), magnesium (Mg), carbon, or Ag containing a glass frit, or may include an alloy thereof, but aspects of the present disclosure are not limited thereto. For example, each of the first electrode layer 511b and the second electrode layer 511c may include Ag having a low resistivity, so as to enhance an electrical characteristic and/or a vibration characteristic of the vibration layer 511a. For example, carbon may be a carbon material including graphite, carbon black, ketjen black, and carbon nanotube, but aspects of the present disclosure are not limited thereto.

The vibration layer 511a may be polarized (or poling) by a certain voltage applied to the first electrode layer 511b and the second electrode layer 511c in a certain temperature atmosphere or a temperature atmosphere which is changed from a high temperature to a room temperature, but aspects of the present disclosure are not limited thereto. For example, a polarization direction (or a poling direction)

formed in the vibration layer 511a may be formed or aligned (or arranged) from the first electrode layer 511b to the second electrode layer 511c, but is not limited thereto and may be formed or aligned (or arranged) from the second electrode layer 511c to the first electrode layer 511b.

The vibration layer 511a may alternately and repeatedly contract or expand based on an inverse piezoelectric effect based on a driving signal applied from the outside to the first electrode layer 511b and the second electrode layer 511c by a driving circuit to vibrate. For example, the vibration layer 511a may vibrate in a vertical direction (or a thickness direction) and a plane direction, based on a signal applied to the first electrode layer 511b and the second electrode layer 511c by the driving circuit. The vibration layer 511a may be displaced (or vibrated or driven) based on plane-direction contraction and/or expansion, thereby enhancing a vibration characteristic including a sound characteristic and/or a sound pressure level characteristic of the vibration apparatus 500.

The vibration generating parts 510 and 520 of the vibration apparatus 500 according to an aspect of the present disclosure may include a first cover member 513 and a second cover member 515.

The first cover member 513 may be disposed at the first surface of the vibration part 511. For example, the first cover member 513 may be configured to cover the first electrode layer 511b of the vibration part 511. For example, the first cover member 513 may be configured to have a size which is greater than that of the vibration part 511. The first cover member 513 may be configured to protect the first surface of the vibration part 511 and the first electrode layer 511b.

The second cover member 515 may be disposed at the second surface of the vibration part 511. For example, the second cover member 515 may be configured to cover the second electrode layer 511c of the vibration part 511. The second cover member 515 may be configured to protect the second surface of the vibration part 511 and the second electrode layer 511c. The second cover layer 515 may be configured to surround all of the second surface of the vibration part 511 and a portion of the lateral surface of the vibration part 511. For example, the second cover layer 515 may be a protection layer or a protection member.

The first cover member 513 and the second cover member 515 according to an aspect of the present disclosure may include the same material or different materials. For example, each of the first cover member 513 and the second cover member 515 may be a polyimide film, a polyethylene terephthalate film, or a polyethylene naphthalate film, but aspects of the present disclosure are not limited thereto.

The first cover member 513 may be connected with or coupled to the first electrode layer 511b or the first surface of the vibration part 511 by a first adhesive layer 517. For example, the first cover member 513 may be connected with or coupled to the first electrode layer 511b or the first surface of the vibration part 511 by a film laminating process, for example, using the first adhesive layer 517.

The second cover member 515 may be connected with or coupled to the second electrode layer 511c or the second surface of the vibration part 511 by a second adhesive layer 519. For example, the second cover member 515 may be connected with or coupled to the second electrode layer 511c or the second surface of the vibration part 511 by a film laminating process, for example, using the second adhesive layer 519.

The first adhesive layer 517 and the second adhesive layer 519 according to an aspect of the present disclosure may include an electrical insulating material which has adhesive properties and is capable of compression and decompression. For example, the first adhesive layer 517 and the second adhesive layer 519 may include epoxy resin, acrylic resin, silicone resin, or urethane resin, but aspects of the present disclosure are not limited thereto. For example, the first adhesive layer 517 and the second adhesive layer 519 may include a pressure sensitive adhesive (PSA), a thermo-curable adhesive, a thermo-plastic adhesive, or a thermal bonding adhesive (or a hot-melt adhesive), but examples of the present disclosure are not limited thereto. For example, the first adhesive layer 517 and the second adhesive layer 519 may include the thermo-curable adhesive or the thermal bonding adhesive. The thermal bonding adhesive may be a heat-active type or a thermo-curable type. Applications benefitting from a thermo-curable adhesive may be a car because this helps with moisture damage from high temperature and/or high humidity.

The first adhesive layer 517 and the second adhesive layer 519 may be provided between the first cover member 513 and the second cover member 515. For example, the first adhesive layer 517 and the second adhesive layer 519 may be provided between the first cover member 513 and the second cover member 515 to surround the vibration part 511. For example, one or more of the first adhesive layer 517 and the second adhesive layer 519 may be configured to partially or fully surround the vibration part 511.

The vibration generating parts 510 and 520 of the vibration apparatus 500 according to an aspect of the present disclosure may further include a signal supply member 550.

The signal supply member 550 may be configured to supply a driving signal, supplied from the driving circuit part, to the vibration part 511 or the vibration generating parts 510 and 520. The signal supply member 550 may be electrically connected with the vibration part 511 at one side of each of the vibration apparatus 500 or the vibration generating parts 510 and 520. The signal supply member 550 may be electrically connected with the first electrode layer 511b and the second electrode layer 511c.

A portion of the signal supply member 550 may be accommodated (or inserted) between the first cover member 513 and the second cover member 515. An end portion (or a distal end portion or one side) of the signal supply member 550 may be disposed or inserted (or accommodated) between one edge portion of the first cover member 513 and one edge portion of the second cover member 515. The one edge portion of the first cover member 513 and the one edge portion of the second cover member 515 may accommodate or vertically cover the end portion (or the distal end portion or the one side) of the signal supply member 550. Therefore, the signal supply member 550 may be provided as one body with the vibration generating parts 510 and 520. For example, the signal supply member 550 may be configured with a signal cable, a flexible cable, a flexible printed circuit cable, a flexible flat cable, a single-sided flexible printed circuit, a single-sided flexible printed circuit board (PCB), a flexible multi-layer printed circuit, or a flexible multi-layer PCB, but aspects of the present disclosure are not limited thereto.

The signal supply member 550 according to an aspect of the present disclosure may include a base member 551 and a plurality of signal lines 553a and 553b. For example, the signal supply member 550 may include the base member 551, a first signal line 553a, and a second signal line 553b. For example, the base member 551 may be a cable base member, but aspects of the present disclosure are not limited thereto.

The base member 551 may include a transparent or opaque plastic material, but aspects of the present disclosure are not limited thereto. The base member 551 may have a certain width in a first direction X and may extend long in a second direction Y intersecting with the first direction X.

The first and second signal lines 553a and 553b may be disposed at a first surface of the base member 551. For example, the first and second signal lines 553a and 553b may be disposed at the first surface of the base member 551 along (e.g., in parallel to) the second direction Y and may be spaced apart from or electrically disconnected from each other in the first direction X. The first and second signal lines 553a and 553b may be disposed at the first surface of the base member 551 in parallel. For example, the first and second signal lines 553a and 553b may be implemented in a line shape, based on patterning of a metal layer (or a conductive layer) which is formed or deposited on the first surface of the base member 551, but aspects of the present disclosure are not limited thereto.

End portions (or distal end portions or one sides) of the first and second signal lines 553a and 553b may be spaced apart from each other, and thus, may be individually curved or bent.

The end portion (or the distal end portion or the one side) of the first signal line 553a may be electrically connected with the first electrode layer 511b of the vibration part 511. For example, the end portion of the first signal line 553a may be electrically connected with at least a portion of the first electrode layer 511b of the vibration part 511 at one edge portion of the first cover member 513. For example, the end portion (or the distal end portion or the one side) of the first signal line 553a may be electrically and directly connected with at least a portion of the first electrode layer 511b of the vibration part 511. For example, the end portion (or the distal end portion or the one side) of the first signal line 553a may be directly connected with or directly contact the first electrode layer 511b of the vibration part 511. For example, the end portion of the first signal line 553a may be electrically connected with the first electrode layer 511b by a conductive double-sided tape. Accordingly, the first signal line 553a may supply a first driving signal, supplied from a vibration driver, to the first electrode layer 511b of the vibration part 511.

The end portion (or the distal end portion or the one side) of the second signal line 553b may be electrically connected with the second electrode layer 511c of the vibration part 511. For example, the end portion of the second signal line 553b may be electrically connected with at least a portion of the second electrode layer 511c of the vibration part 511 at one edge portion of the second cover member 515. For example, the end portion (or the distal end portion or the one side) of the second signal line 553b may be electrically and directly connected with at least a portion of the second electrode layer 511c of the vibration part 511. For example, the end portion of the second signal line 553b may be electrically connected with or directly contact the second electrode layer 511c of the vibration part 511. For example, the end portion of the second signal line 553b may be electrically connected with the second electrode layer 511c by a conductive double-sided tape. Accordingly, the second signal line 553b may supply a second driving signal, supplied from a vibration driver, to the second electrode layer 511c of the vibration part 511.

The signal supply member 550 according to an aspect of the present disclosure may further include an insulation layer 555.

The insulation layer 555 may be disposed at the first surface of the base member 551 to cover each of the first signal line 553a and the second signal line 553b except the end portion (or the one side) of the signal supply member 550.

The end portion (or the one side) 555a of the insulation layer 555 and the end portion (or the one side) of the signal supply member 550 including the end portion (or the one side) of the base member 551 may be inserted (or accommodated) between the first cover member 513 and the second cover member 515 and may be fixed between the first cover member 513 and the second cover member 515 by the first adhesive layer 517 and the second adhesive layer 519. Therefore, an end portion (or one side) of the first signal line 553a may be maintained with being electrically connected with the first electrode layer 511b of the vibration part 511, and an end portion (or one side) of the second signal line 553b may be maintained with being electrically connected with the second electrode layer 511c of the vibration part 511. Also, the end portion (or the one side) of the signal supply member 550 may be inserted (or accommodated) between the first cover member 513 and the vibration part 511, and thus, may prevent or reduce the occurrence of a connection defect between the vibration generating part 510 and the signal supply member 550 caused by the movement or bending of the signal supply member 550 which is caused by a manufacturing process of attaching the signal supply member 550 to the vibration part 511.

In the signal supply member 550 according to an aspect of the present disclosure, each of the end portion (or the one side) of the base member 551 and the end portion (or the one side) 555a of the insulation layer 555 may be removed. For example, each of the end portion of the first signal line 553a and the end portion of the second signal line 553b may not be supported or covered by each of the end portion (or the one side) of the base member 551 and the end portion (or the one side) 555a of the insulation layer 555 and may be exposed at the outside. For example, the end portion of each of the first and second signal lines 553a and 553b may protrude (or extend) to have a certain length from an end 551e of the base member 551 or an end 555e of the insulation layer 555. Accordingly, each of the end portion (or the distal end portion or the one side) of each of the first and second signal lines 553a and 553b may be individually or independently bent.

The end portion (or the one side) of the first signal line 553a, which is not supported by each of the end portion (or the one side) of the base member 551 and the end portion (or the one side) 555a of the insulation layer 555, may be directly connected with or directly contact the first electrode layer 511b of the vibration part 511. The end portion (or the one side) of the second signal line 553b, which is not supported by each of the end portion (or the one side) of the base member 551 and the end portion (or the one side) 555a of the insulation layer 555, may be directly connected with or directly contact the second electrode layer 511c of the vibration part 511.

According to an aspect of the present disclosure, a portion of the signal supply member 550 or a portion of the base member 551 may be disposed or inserted (or accommodated) between the first cover member 513 and the second cover member 515, and thus, the signal supply member 550 may be provided as one body with the vibration generating parts 510 and 520. Accordingly, the vibration generating parts 510 and 520 and the signal supply member 550 may be configured as one part, and thus, an effect of uni-materialization may be realized.

According to an aspect of the present disclosure, because the first signal line 553a and the second signal line 553b of the signal supply member 550 are provided as one body with the vibration generating parts 510 and 520, a soldering process for an electrical connection between the vibration generating parts 510 and 520 and the signal supply member 550 may not be needed, and thus, a manufacturing process and a structure of the vibration generating parts 510 and 520 may be simplified, thereby decreasing a harmful process.

Figure 20:
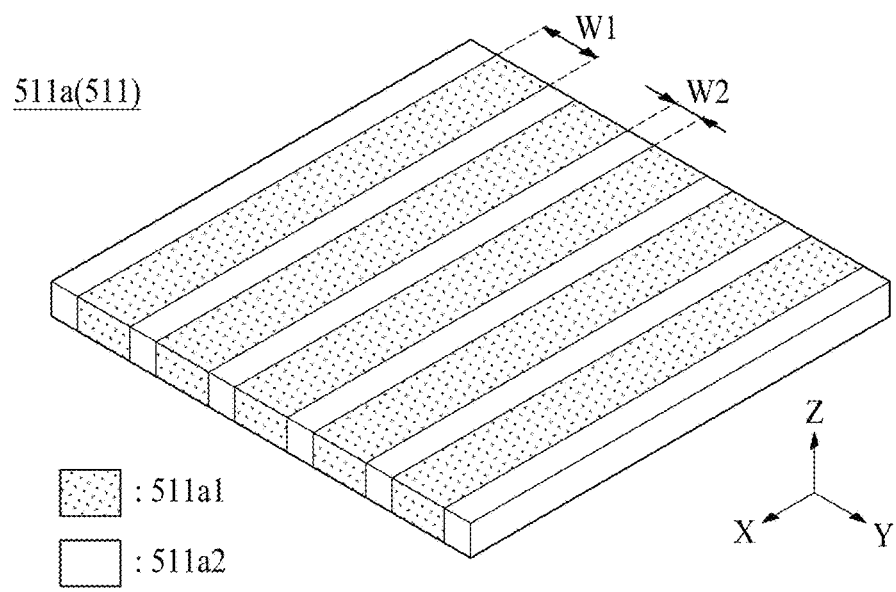
FIG. 20 illustrates a vibration layer according to another aspect of the present disclosure.

FIG. 20 illustrates a vibration layer according to another aspect of the present disclosure. FIG. 20 illustrates another aspect of the vibration layer described above with reference to FIGS. 17 to 19 according to another aspect of the present disclosure.

As shown in FIGS. 18 and 20, a vibration layer 511a according to another aspect of the present disclosure may include a plurality of first portions 511a1 and a plurality of second portions 511a2. For example, the plurality of first portions 511a1 and the plurality of second portions 511a2 may be alternately and repeatedly arranged in a first direction X (or a second direction Y).

Each of the plurality of first portions 511a1 may include an inorganic material having a piezoelectric effect (or a piezoelectric characteristic). For example, each of the plurality of first portions 511a1 may include one or more of a piezoelectric inorganic material and a piezoelectric organic material. For example, each of the plurality of first portions 511a1 may be an inorganic portion, an inorganic material portion, a piezoelectric portion, a piezoelectric material portion, or an electroactive portion, but aspects of the present disclosure are not limited thereto.

According to an aspect of the present disclosure, each of the plurality of first portions 511a1 may have a first width W1 parallel to the first direction X and may extend in the second direction Y. Each of the plurality of first portions 511a1 may be substantially the same as the vibration layer 511a described above with reference to FIGS. 17 to 19, and thus, repeated descriptions thereof are omitted or will be briefly given.

Each of the plurality of second portions 511a2 may be disposed between the plurality of first portions 511a1. For example, each of the plurality of first portions 511a1 may be disposed between two adjacent second portions 511a2 of the plurality of second portions 511a2. Each of the plurality of second portions 511a2 may have a second width W2 parallel to the first direction X (or the second direction Y) and may extend in the second direction Y (or the first direction X). The first width W1 may be equal to or different from the second width W2. For example, the first width W1 may be greater than the second width W2. For example, the first portion 511a1 and the second portion 511a2 may include a line shape or a stripe shape, which has the same size or different sizes, without being limited thereto. Other shapes such as a zigzag shape, an irregular shape, a dot shape including an oval shape, a polygonal shape, or a donut shape, a circular shape or a triangular plate shape etc. could be also possible.

According to embodiments of the present disclosure, each of the first width W1 of the plurality of first portions 511a1 and the second width W2 of the plurality of second portions 511a2 may be variously changed. For example, in the vibration layer 511a, the width W2 of each of the plurality of second portions 511a2 may decrease progressively in a direction from a center portion of the vibration layer 511a to both edge portions (or both ends or both periphery portions) thereof. For example, the second portion 511a2 having the largest width W2 among the plurality of second portions 511a2 may be disposed at a center portion of the vibration layer 511a, and the second portion 511a2 having the smallest width W2 among the plurality of second portions 511a2 may be disposed at both edge portions of the vibration layer 511a. Accordingly, when the vibration layer 511a vibrates in the vertical direction Z, an overlap of a resonance frequency or interference of a sound wave occurring at a portion at which a largest stress concentrates (e.g., where interference between signals is highest due to an overlap of, for example, different resonant frequencies) may be reduced or minimized, and thus, a dip phenomenon of a sound pressure level occurring in a low pitched sound band (e.g., 3 kHz or less) may be reduced and the flatness of a sound characteristic may be improved in the low pitched sound bands. For example, the dip may be a phenomenon in which a sound pressure level is lowered to a specific frequency. The flatness of a sound characteristic may be a level of a deviation between a highest sound pressure level and a lowest sound pressure level (e.g., a flatness in the peak-to-peak is increased, or the peak-to-peak deviation is decreased) which is over all frequencies.

Each of the plurality of second portions 511a2 may be configured to fill a gap between two adjacent first portions 511a1. Each of the plurality of second portions 511a2 may be configured to fill a gap between two adjacent first portions 511a1, and thus, may be connected with or contact a lateral surface of an adjacent first portion 511a1. According to an aspect of the present disclosure, each of the plurality of first portions 511a1 and the plurality of second portions 511a2 may be disposed (or arranged) in parallel on the same plane (or the same layer). Accordingly, the vibration layer 511a may extend to have a desired size or length, based on lateral coupling (or connection) between the first portion 511a1 and the second portion 511a2.

According to an aspect of the present disclosure, each of the plurality of second portions 511a2 may absorb an impact applied to the first portion 511a1 from the outside, and thus, the durability of the first portion 511a1 may be enhanced and flexibility may be provided to the vibration layer 511a. Each of the plurality of second portions 511a2 may include an organic material having a ductile characteristic. For example, the plurality of second portions 511a2 may include one or more of an epoxy-based polymer, an acrylic polymer, and a silicone-based polymer, but aspects of the present disclosure are not limited thereto. For example, each of the plurality of second portions 511a2 may be an organic portion, an organic material portion, an adhesive portion, a stretching portion, a bending portion, a damping portion, or a ductile portion, but aspects of the present disclosure are not limited thereto.

A first surface of each of the plurality of first portions 511a1 and the plurality of second portions 511a2 may be connected with the first electrode layer 511b in common. A second surface of each of the plurality of first portions 511a1 and the plurality of second portions 511a2 may be connected with the second electrode layer 511c in common.

According to another aspect of the present disclosure, the plurality of first portions 511a1 and the plurality of second portions 511a2 may be disposed (or connected) on the same plane, and thus, the vibration layer 511a may have a single thin film form. Accordingly, the vibration part 511 or the vibration generating parts 510 and 520 including the vibration layer 511a according to another aspect of the present disclosure may be vibrated by the first portion 511a1 having a vibration characteristic and may be bent in a curved shape by the second portion 511a2 having flexibility.

Figure 21:
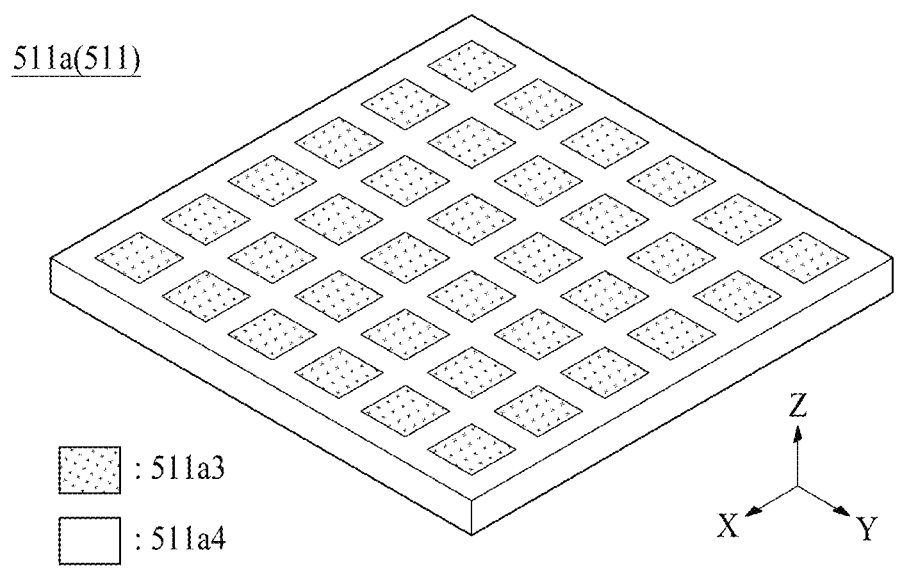
FIG. 21 illustrates a vibration layer according to another aspect of the present disclosure.

FIG. 21 illustrates a vibration layer according to another aspect of the present disclosure. FIG. 21 illustrates another aspect of the vibration layer described above with reference to FIGS. 17 to 19 according to another aspect of the present disclosure.

As illustrated in FIGS. 18 and 21, the vibration layer 511a according to another aspect of the present disclosure may include a plurality of first portions 511a3 and a second portion 511a4 disposed between the plurality of first portions 511a3.

The plurality of first portions 511a3 may be arranged to be spaced apart from one another in each of a first direction X and a second direction Y. For example, the plurality of first portions 511a3 may have a hexahedral shape having the same size and may be arranged in a lattice shape, but aspects of the present disclosure are not limited thereto. For example, each of the plurality of first portions 511a3 may have a circular plate shape, an oval plate shape, or a polygonal plate shape, but aspects of the present disclosure are not limited thereto.

Each of the plurality of first portions 511a3 may include substantially the same material as that of the first portion 511a1 described above with reference to FIG. 20, and thus, repeated descriptions thereof are omitted.

The second portion 511a4 may be disposed between the plurality of first portions 511a3 in each of the first direction X and the second direction Y. The second portion 511a4 may be configured to fill a gap between two adjacent first portions 511a3 or surround each of the plurality of first portions 511a3, and thus, may be connected with or contact an adjacent first portion 511a3. The second portion 511a4 may include substantially the same material as that of the second portion 511a2 described above with reference to FIG. 20, and thus, repeated descriptions thereof are omitted.

A first surface of each of the plurality of first portions 511a3 and the second portion 511a4 may be connected with the first electrode layer 511b in common. A second surface of each of the plurality of first portions 511a3 and the second portion 511a4 may be connected with the second electrode layer 511c in common.

According to another aspect of the present disclosure, the plurality of first portions 511a3 and the second portion 511a4 may be disposed (or connected) on the same plane, and thus, the vibration layer 511a may have a single thin film form. Accordingly, the vibration part 511 or the vibration generating parts 510 and 520 including the vibration layer 511a according to another aspect of the present disclosure may be vibrated by the first portion 511a3 having a vibration characteristic and may be bent in a curved shape by the second portion 511a4 having flexibility.

A vibration apparatus and a display apparatus including the same according to various aspects of the present disclosure will be described below.

A vibration apparatus according to various aspects of the present disclosure may include a first vibration generating part in a first area of a vibration member, and a second vibration generating part in a second area of the vibration member. The first vibration generating part and the second vibration generating part may be configured to vibrate the vibration member in one or more vibration mode shapes.

According to various aspects of the present disclosure, each of the first vibration generating part and the second vibration generating part may be disposed to overlap a vibration center portion of the one or more vibration mode shapes.

According to various aspects of the present disclosure, the one or more vibration mode shapes may include a first vibration mode shape and a second vibration mode shape. Each of the first vibration generating part and the second vibration generating part may be disposed to overlap at least one of a first vibration center portion of the first vibration mode shape and a second vibration center portion of the second vibration mode shape.

According to various aspects of the present disclosure, a center of each of the first vibration generating part and the second vibration generating part may be disposed to overlap one of the first vibration center portion and the second vibration center portion.

According to various aspects of the present disclosure, the center of each of the first vibration generating part and the second vibration generating part may be disposed to overlap the first vibration center portion.

According to various aspects of the present disclosure, each of the first vibration generating part and the second vibration generating part may be disposed to overlap the first vibration center portion and the second vibration center portion.

According to various aspects of the present disclosure, in the first vibration mode shape, the first vibration center portion may be formed in two areas in the vibration member.

According to various aspects of the present disclosure, the two areas may include a first vibration center area and a second vibration center area. The first vibration center area and the second vibration center area of the first vibration center portion may be respectively provided in the first area and the second area of the vibration member.

According to various aspects of the present disclosure, in the second vibration mode shape, the second vibration center portion may be formed in three areas in the vibration member.

According to various aspects of the present disclosure, the three areas may include a first vibration center area, a second vibration center area, and a third vibration center area between the first vibration center area and the second vibration center area. The first vibration center area, the second vibration center area, and the third vibration center area of the second vibration center portion may be respectively provided in the first area and the second area of the vibration member and a center area between the first area and the second area.

According to various aspects of the present disclosure, the first vibration generating part and the second vibration generating part may be configured to vibrate in a same direction or different directions to vibrate the vibration member.

According to various aspects of the present disclosure, the first vibration generating part and the second vibration generating part may be configured to vibrate with a normal phase to vibrate the vibration member.

According to various aspects of the present disclosure, one of the first vibration generating part and the second vibration generating part may be configured to vibrate with a normal phase and the other vibration generating part of the first vibration generating part and the second vibration generating part may be configured to vibrate with a reverse phase to vibrate the vibration member.

According to various aspects of the present disclosure, one of the first vibration generating part and the second vibration generating part may be configured to vibrate with a normal phase to vibrate the vibration member, and the other vibration generating part of the first vibration generating part and the second vibration generating part may not vibrate.

According to various aspects of the present disclosure, each of the first vibration generating part and the second vibration generating part may include a first cover member, a second cover member, and a vibration part between the first cover member and the second cover member, the vibration part including a piezoelectric material.

According to various aspects of the present disclosure, the vibration part may include a first electrode layer, a second electrode layer and a vibration layer between the first electrode layer and the second electrode layer.

According to various aspects of the present disclosure, each of the first vibration generating part and the second vibration generating part may further include a signal supply member electrically connected with the vibration part. A portion of the signal supply member may be accommodated between the first cover member and the second cover member.

According to various aspects of the present disclosure, the signal supply member may be provided as one body with the first vibration generating part and the second vibration generating part.

According to various aspects of the present disclosure, the vibration member may be a display member of a display apparatus. The vibration member may include a first surface configured to display an image and a second surface opposite to the first surface. Each of the first vibration generating part and the second vibration generating part may be connected with the second surface of the vibration member.

According to various aspects of the present disclosure, the vibration apparatus may further include a vibration driving circuit connected with each of the first vibration generating part and the second vibration generating part. The vibration driving circuit may be configured to sense a touch position of the first surface of the vibration member and to control vibration driving of the first vibration generating part and the second vibration generating part, based on the touch position.

According to various aspects of the present disclosure, the vibration driving of the first vibration generating part and the second vibration generating part may be controlled such that: based on that the touch position is located in a center area between the first area and the second area, both the first vibration generating part and the second vibration generating part vibrate with a normal phase to vibrate the vibration member, based on that the touch position is located at a vibration center portion of the one or more vibration mode shapes in the first area or the second area, one of the first vibration generating part and the second vibration generating part vibrates with a normal phase and the other vibration generating part of the first vibration generating part and the second vibration generating part vibrates with a reverse phase to vibrate the vibration member, and based on that the touch position is located in the first area or the second area, but not at the vibration center portion of the one or more vibration mode shapes, one of the first vibration generating part and the second vibration generating part vibrates with a normal phase to vibrate the vibration member, and the other vibration generating part of the first vibration generating part and the second vibration generating part does not vibrate.

According to various aspects of the present disclosure, the vibration driving circuit may include a touch sensing part configured to sense a touch position of the vibration member, a vibration driver configured to generate a vibration driving signal to control vibration driving of the first vibration generating part and the second vibration generating part, and a vibration controller configured to control driving of the vibration driver, based on the touch position sensed by the touch sensing part.

A display apparatus according to various aspects of the present disclosure may include a display member configured to display an image, one or more vibration apparatuses configured to vibrate the display member, and a vibration driving circuit configured to sense a touch position of the display member and control the one or more vibration apparatuses, based on the touch position, the one or more vibration apparatuses may include a vibration member including a first area and a second area, a first vibration generating part in the first area of the display member, and a second vibration generating part in the second area of the vibration member. The first vibration generating part and the second vibration generating part may be configured to vibrate the display member in one or more vibration mode shapes.

According to various aspects of the present disclosure, the display member may include a display panel including a plurality of pixels configured to display the image, and a touch panel connected with the display panel.

According to various aspects of the present disclosure, the vibration driving circuit may include a touch sensing part connected with the touch panel to sense a touch position of the display member, a vibration driver configured to generate a vibration driving signal to control vibration driving of the one or more vibration apparatuses, and a vibration controller configured to control driving of the vibration driver, based on the touch position sensed by the touch sensing part.

A vibration apparatus according to an aspect of the present disclosure may be applied to or included in a touch driving circuit provided in the display apparatus. The display apparatus according to an aspect of the present disclosure may be applied to or included in mobile apparatuses, video phones, smart watches, watch phones, wearable apparatuses, foldable apparatuses, rollable apparatuses, bendable apparatuses, flexible apparatuses, curved apparatuses, sliding apparatus, variable apparatus, electronic organizers, electronic book, portable multimedia players (PMPs), personal digital assistants (PDAs), MP3 players, mobile medical apparatuses, desktop personal computers (PCs), laptop PCs, netbook computers, workstations, navigation apparatuses, automotive navigation apparatuses, automotive display apparatuses, automotive apparatuses, theatre apparatuses, theatre display apparatuses, televisions (TVs), wall paper display apparatuses, signage apparatuses, game machines, notebook computers, monitors, cameras, camcorders, home appliances, etc.

It will be apparent to those skilled in the art that various modifications and variations can be made in the vibration apparatus and the display apparatus including the same of the present disclosure without departing from the technical idea or scope of the disclosure. Thus, it is intended that the present disclosure cover the modifications and variations of this disclosure provided that within the scope of the claims and their equivalents.

What is claimed is:
1. A vibration apparatus, comprising:
 a first vibration generating part in a first area of a vibration member; and
 a second vibration generating part in a second area of the vibration member, wherein the first vibration generating part and the second vibration generating part are configured to vibrate the vibration member in one or more vibration mode shapes, wherein the one or more vibration mode shapes comprise a first vibration mode shape and a second vibration mode shape, wherein each of the first vibration generating part and the second vibration generating part is disposed to overlap at least one of a first vibration center portion of the first vibration mode shape and a second vibration center portion of the second vibration mode shape, wherein, in the second vibration mode shape, the second vibration center portion is formed in three areas in the vibration member, wherein the three areas comprise a first vibration center area, a second vibration center area, and a third vibration center area between the first vibration center area and the second vibration center area, and wherein the first vibration center area, the second vibration center area, and the third vibration center area of the second vibration center portion are respectively provided in the first area and the second area of the vibration member and a center area between the first area and the second area.

2. The vibration apparatus of claim 1, wherein each of the first vibration generating part and the second vibration generating part is disposed to overlap a vibration center portion of the one or more vibration mode shapes.

3. The vibration apparatus of claim 1, wherein a center of each of the first vibration generating part and the second vibration generating part is disposed to overlap one of the first vibration center portion and the second vibration center portion.

4. The vibration apparatus of claim 3, wherein the center of each of the first vibration generating part and the second vibration generating part is disposed to overlap the first vibration center portion.

5. The vibration apparatus of claim 1, wherein each of the first vibration generating part and the second vibration generating part is disposed to overlap the first vibration center portion and the second vibration center portion.

6. The vibration apparatus of claim 1, wherein, in the first vibration mode shape, the first vibration center portion is formed in two areas in the vibration member.

7. The vibration apparatus of claim 6, wherein the two areas comprise a first vibration center area and a second vibration center area, and wherein the first vibration center area and the second vibration center area of the first vibration center portion are respectively provided in the first area and the second area of the vibration member.

8. The vibration apparatus of claim 1, wherein the first vibration generating part and the second vibration generating part are configured to vibrate in a same direction or different directions to vibrate the vibration member.

9. The vibration apparatus of claim 8, wherein the first vibration generating part and the second vibration generating part are configured to vibrate with a normal phase to vibrate the vibration member.

10. The vibration apparatus of claim 8, wherein one of the first vibration generating part and the second vibration generating part is configured to vibrate with a normal phase, and the other vibration generating part of the first vibration generating part and the second vibration generating part is configured to vibrate with a reverse phase to vibrate the vibration member.

11. The vibration apparatus of claim 8, wherein one of the first vibration generating part and the second vibration generating part is configured to vibrate with a normal phase to vibrate the vibration member, and the other vibration generating part of the first vibration generating part and the second vibration generating part does not vibrate.

12. The vibration apparatus of claim 1, wherein each of the first vibration generating part and the second vibration generating part comprises:
a first cover member;
a second cover member; and
a vibration part between the first cover member and the second cover member, the vibration part including a piezoelectric material.

13. The vibration apparatus of claim 12, wherein the vibration part includes a first electrode layer, a second electrode layer and a vibration layer between the first electrode layer and the second electrode layer.

14. The vibration apparatus of claim 12, wherein each of the first vibration generating part and the second vibration generating part further comprises a signal supply member electrically connected with the vibration part, and
wherein a portion of the signal supply member is accommodated between the first cover member and the second cover member.

15. The vibration apparatus of claim 14, wherein the signal supply member is provided as one body with the first vibration generating part and the second vibration generating part.

16. The vibration apparatus of claim 1, wherein the vibration member is a display member of a display apparatus,
wherein the vibration member comprises a first surface configured to display an image and a second surface opposite to the first surface, and
wherein each of the first vibration generating part and the second vibration generating part is connected with the second surface of the vibration member.

17. The vibration apparatus of claim 16, further comprising a vibration driving circuit connected with each of the first vibration generating part and the second vibration generating part,
wherein the vibration driving circuit is configured to sense a touch position of the first surface of the vibration member and to control vibration driving of the first vibration generating part and the second vibration generating part, based on the touch position.

18. The vibration apparatus of claim 17, wherein the vibration driving of the first vibration generating part and the second vibration generating part is controlled such that:
based on that the touch position is located in a center area between the first area and the second area, both the first vibration generating part and the second vibration generating part vibrate with a normal phase to vibrate the vibration member,
based on that the touch position is located at a vibration center portion of the one or more vibration mode shapes in the first area or the second area, one of the first vibration generating part and the second vibration generating part vibrates with a normal phase and the other vibration generating part of the first vibration generating part and the second vibration generating part vibrates with a reverse phase to vibrate the vibration member, and
based on that the touch position is located in the first area or the second area, but not at the vibration center portion of the one or more vibration mode shapes, one of the first vibration generating part and the second vibration generating part vibrates with a normal phase to vibrate the vibration member, and the other vibration generating part of the first vibration generating part and the second vibration generating part does not vibrate.

19. The vibration apparatus of claim 17, wherein the vibration driving circuit comprises:
   a touch sensing part configured to sense a touch position of the vibration member;
   a vibration driver configured to generate a vibration driving signal to control vibration driving of the first vibration generating part and the second vibration generating part; and
   a vibration controller configured to control driving of the vibration driver, based on the touch position sensed by the touch sensing part.

20. A display apparatus, comprising:
   a display member configured to display an image;
   one or more vibration apparatuses configured to vibrate the display member; and
   a vibration driving circuit configured to sense a touch position of the display member and to control the one or more vibration apparatuses, based on the touch position,
   wherein the one or more vibration apparatuses comprise:
      a first vibration generating part in a first area of a display member; and
      a second vibration generating part in a second area of the display member,
   wherein the first vibration generating part and the second vibration generating part are configured to vibrate the display member in one or more vibration mode shapes,
   wherein the one or more vibration mode shapes comprise a first vibration mode shape and a second vibration mode shape,
   wherein each of the first vibration generating part and the second vibration generating part is disposed to overlap at least one of a first vibration center portion of the first vibration mode shape and a second vibration center portion of the second vibration mode shape,
   wherein, in the second vibration mode shape, the second vibration center portion is formed in three areas in the display member,
   wherein the three areas comprise a first vibration center area, a second vibration center area, and a third vibration center area between the first vibration center area and the second vibration center area, and
   wherein the first vibration center area, the second vibration center area, and the third vibration center area of the second vibration center portion are respectively provided in the first area and the second area of the display member and a center area between the first area and the second area.

21. The display apparatus of claim 20, wherein the display member comprises:
   a display panel including a plurality of pixels configured to display the image; and
   a touch panel connected with the display panel.

22. The display apparatus of claim 21, wherein the vibration driving circuit comprises:
   a touch sensing part connected with the touch panel to sense a touch position of the display member;
   a vibration driver configured to generate a vibration driving signal to control vibration driving of the one or more vibration apparatuses; and
   a vibration controller configured to control driving of the vibration driver, based on the touch position sensed by the touch sensing part.

* * * * *